(12) United States Patent
Yamamura

(10) Patent No.: US 10,338,279 B2
(45) Date of Patent: Jul. 2, 2019

(54) LENS ARRAY HAVING LENSES ARRANGED IN ROWS, LENS UNIT, EXPOSURE DEVICE, LED HEAD, AND IMAGE FORMING APPARATUS

(71) Applicant: Oki Data Corporation, Minato-ku, Tokyo (JP)

(72) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 28 days.

(21) Appl. No.: 15/709,578

(22) Filed: Sep. 20, 2017

(65) Prior Publication Data

US 2018/0088256 A1 Mar. 29, 2018

(30) Foreign Application Priority Data

Sep. 28, 2016 (JP) .................. 2016-189872

(51) Int. Cl.
*G02B 3/00* (2006.01)
*G02B 19/00* (2006.01)
*G03G 15/04* (2006.01)
*G03G 15/043* (2006.01)

(52) U.S. Cl.
CPC ........... *G02B 3/0062* (2013.01); *G02B 3/005* (2013.01); *G02B 3/0043* (2013.01); *G02B 19/0014* (2013.01); *G02B 19/0066* (2013.01); *G03G 15/0435* (2013.01); *G03G 15/04054* (2013.01)

(58) Field of Classification Search
CPC .... G02B 3/0062; G02B 3/0043; G02B 3/005; G02B 19/0014; G02B 19/0066; G03G 15/04054; G03G 15/0435
See application file for complete search history.

(56) References Cited

U.S. PATENT DOCUMENTS

2013/0021672 A1* 1/2013 Yamamura ....... B29D 11/00298
359/619

FOREIGN PATENT DOCUMENTS

JP 2008092006 A 4/2008

* cited by examiner

*Primary Examiner* — Sandra Brase
(74) *Attorney, Agent, or Firm* — Panitch Schwarze Belisario & Nadel LLP

(57) ABSTRACT

A lens array includes a plurality of lenses arranged in at least two rows parallel with each other. The plurality of lenses are arranged in a first direction in each row. Each of the plurality of lenses allows light to pass in a second direction. An arrangement center is defined at a center position between the two rows in a third direction perpendicular to both of the first direction and the second direction. Each of the plurality of lenses includes an incident surface and an emission surface. A surface apex of the emission surface is displaced with respect to a surface apex of the incident surface in a direction away from the arrangement center in the third direction.

7 Claims, 19 Drawing Sheets

LENS ARRAY HAVING LENSES ARRANGED IN ROWS, LENS UNIT, EXPOSURE DEVICE, LED HEAD, AND IMAGE FORMING APPARATUS

BACKGROUND OF THE INVENTION

The present invention relates to a lens array, a lens unit, an exposure device, an LED head, and an image forming apparatus.

An electrophotographic image forming apparatus includes an LED head (i.e., an exposure device) in which a plurality of LEDs are arranged. The image forming apparatus further includes an optical system that forms erecting unmagnified images of objects in a line shape. The optical system includes a lens array in which a plurality of microlenses are arranged. Such an image forming apparatus is disclosed in, for example, Japanese Patent Application Publication No. 2008-92006 (Pages 5-6 and FIG. 1).

However, in the conventional exposure device, a beam shape may change periodically corresponding to an arrangement interval of the microlenses. In such a case, when the image forming apparatus prints an image, vertical streaks may be formed on a printed image at intervals corresponding to the arrangement interval of the microlenses.

SUMMARY OF THE INVENTION

The present invention is intended to enhance quality of a printed image.

According to an aspect of the present invention, there is provided a lens array including a plurality of lenses arranged in at least two rows parallel with each other. The plurality of lenses are arranged in a first direction in each row. Each of the plurality of lenses allows light to pass in a second direction. An arrangement center is defined at a center position between the two rows in a third direction perpendicular to both of the first direction and the second direction. Each of the plurality of lenses includes an incident surface and an emission surface. A surface apex of the emission surface is displaced with respect to a surface apex of the incident surface in a direction away from the arrangement center in the third direction.

According to another aspect of the present invention, there is provided a lens array including a plurality of lenses arranged in at least two rows parallel with each other. The plurality of lenses are arranged in a first direction in each row. Each of the plurality of lenses allows light to pass in a second direction. An arrangement center is defined at a center position between the two rows in a third direction perpendicular to both of the first direction and the second direction. Each of the plurality of lenses includes an incident surface and an emission surface. A surface apex of the incident surface is displaced with respect to a surface apex of the emission surface in a direction away from the arrangement center in the third direction.

According to still another aspect of the present invention, there is provided a lens unit including a first lens array forming a reduced inverted image of a light emitting portion disposed on an incident side of the first lens array, and a second lens array forming a magnified inverted image of the reduced inverted image. The first lens array includes a plurality of first lenses arranged in at least two rows parallel with each other. The plurality of first lenses are arranged in a first direction in each row. Each of the plurality of first lenses allows light to pass in a second direction. An arrangement center is defined at a center position between the two rows in a third direction perpendicular to both of the first direction and the second direction. Each of the plurality of first lenses includes a first incident surface and a first emission surface. A surface apex of the first emission surface is displaced with respect to a surface apex of the first incident surface in a direction away from the arrangement center in the third direction. The second lens array includes a plurality of second lenses arranged in at least two rows parallel with each other. The plurality of second lenses are arranged in the first direction in each row. Each of the plurality of second lenses allows light to pass in the second direction. Each of the plurality of second lenses includes a second incident surface and a second emission surface. A surface apex of the second incident surface is displaced with respect to a surface apex of the second emission surface in a direction away from the arrangement center in the third direction.

With such a configuration, changing of a beam shape at intervals corresponding to an arrangement interval of lenses can be suppressed, and quality of a printed image can be enhanced.

DETAILED DESCRIPTION OF THE PREFERRED EMBODIMENT

Embodiment 1.

Figure 1:
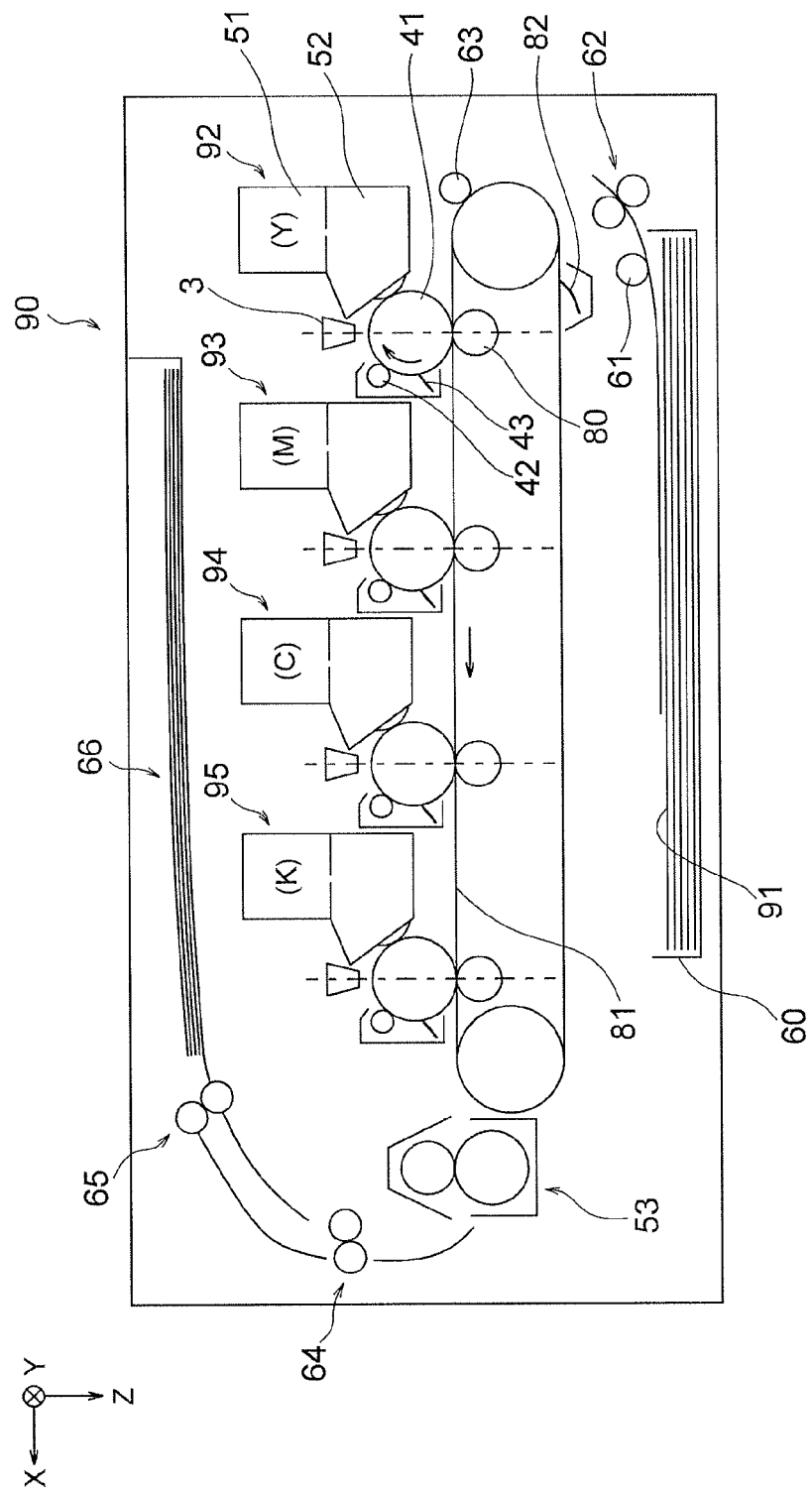
FIG. 1 is a schematic view showing a configuration of a color printer of Embodiment 1 of the present invention.

FIG. 1 is a schematic view showing a configuration of a color printer as an image forming apparatus of Embodiment 1 of the present invention. The color printer 90 shown in FIG. 1 is configured as a color electrophotographic printer. The color printer 90 is configured to form an image on a recording sheet (i.e., a printing medium) based on image data, using a toner including a resin. The toner includes a pigment as a coloring agent.

The color printer 90 includes a sheet cassette 60 that stores a stack of recording sheets 91 as the printing media. The color printer 90 further includes a feed roller 61 that feeds the recording sheet 91 from the sheet cassette 60, and conveying rollers 62 and 63 that convey the recording sheet 91 toward an image forming section. The color printer 90 further includes toner image forming units 92, 93, 94 and 95 (i.e., the image forming section) that form toner images of yellow (Y), magenta (M), cyan (C) and black (K). The toner image forming units 92, 93, 94 and 95 are arranged in this order from upstream to downstream of a conveying path along which the recording sheet 91 is conveyed as shown by an arrow in FIG. 1. The toner image forming units 92, 93, 94 and 95 have the same configurations except for toners.

For example, the toner image forming unit 92 using the yellow toner includes a photosensitive drum 41 as a latent image bearing body that rotates in a direction shown by an arrow in FIG. 1, a charging roller 42 that uniformly charges a surface of the photosensitive drum 41 by applying electrical charge thereto, an LED (Light Emitting Diode) head 3 as an exposure device that emits light to selectively expose the surface of the photosensitive drum 41 based on image data to foam an electrostatic latent image, and a developing device 52 that develops the electrostatic latent image using the toner to form a toner image. The toner image forming unit 92 further includes a toner cartridge 51 that supplies the toner to the developing device 52, and a cleaning blade 43 disposed contacting the photosensitive drum 41 so as to remove a residual toner therefrom.

Further, the color printer 90 includes a transfer section for transferring the toner images (i.e., visualized images) from the photosensitive drums 41 to the recording sheet 91. The transfer section includes a transfer belt 81 that conveys the recording sheet 91, transfer rollers 80 disposed facing the photosensitive drums 41 via the transfer belt 81, and a cleaning blade 82 that scrapes off the toner adhering to the transfer belt 81. The color printer 90 further includes a fixing device 53 that fixes the toner image to the recording sheet 91 by application of heat and pressure, conveying rollers 64 that convey the recording sheet 91 having passed the fixing device 53, ejection rollers 65 that eject the recording sheet 91 (to which the toner image is fixed) to an ejection portion 66. The ejection portion 66 (i.e., a stacker portion) stores the ejected recording sheets 91 thereon.

The charging rollers 42 and the transfer rollers 80 are applied with predetermined voltages by not shown power sources. The transfer belt 81, the photosensitive drums 41, the feed roller 61, the conveying rollers 62, 63 and 64 and the ejection rollers 65 are driven to rotate by not shown motors and gears transmitting driving forces. The developing devices 52, the LED heads 3, the fixing device 53 and not shown motors are connected with not shown power sources and control units.

The color printer 90 further includes an external interface that performs communication with an external device and receives printing data from the external device, and a controller that receives the printing data from the external interface and controls an entire operation of the color printer 90. Detailed descriptions of the external interface and the controller are omitted.

In FIG. 1, an X-axis is defined in a direction along which the recording sheet 91 passes the toner image forming units 92, 93, 94 and 95. A Y-axis is defined in a direction parallel with rotation axes of the photosensitive drums 41. A Z-axis is defined in a direction perpendicular to the X-axis and the Y-axis. In other drawings, the X-axis, the Y-axis and the Z-axis indicate the same directions as those in FIG. 1. Further, the X-axis, the Y-axis and the Z-axis indicate orientations of respective parts shown in the drawings when the parts are assembled in the color printer 90 shown in FIG. 1. Here, the Z-axis is a substantially vertical direction, and a positive direction of the Z-axis indicates a downward direction. A direction of the X-axis is referred to as an X-axis direction (i.e., a third direction), a direction of the Y-axis is referred to as a Y-axis direction (i.e., a first direction), and a direction of the Z-axis is referred to as a Z-axis direction (i.e., a second direction).

Figure 2:
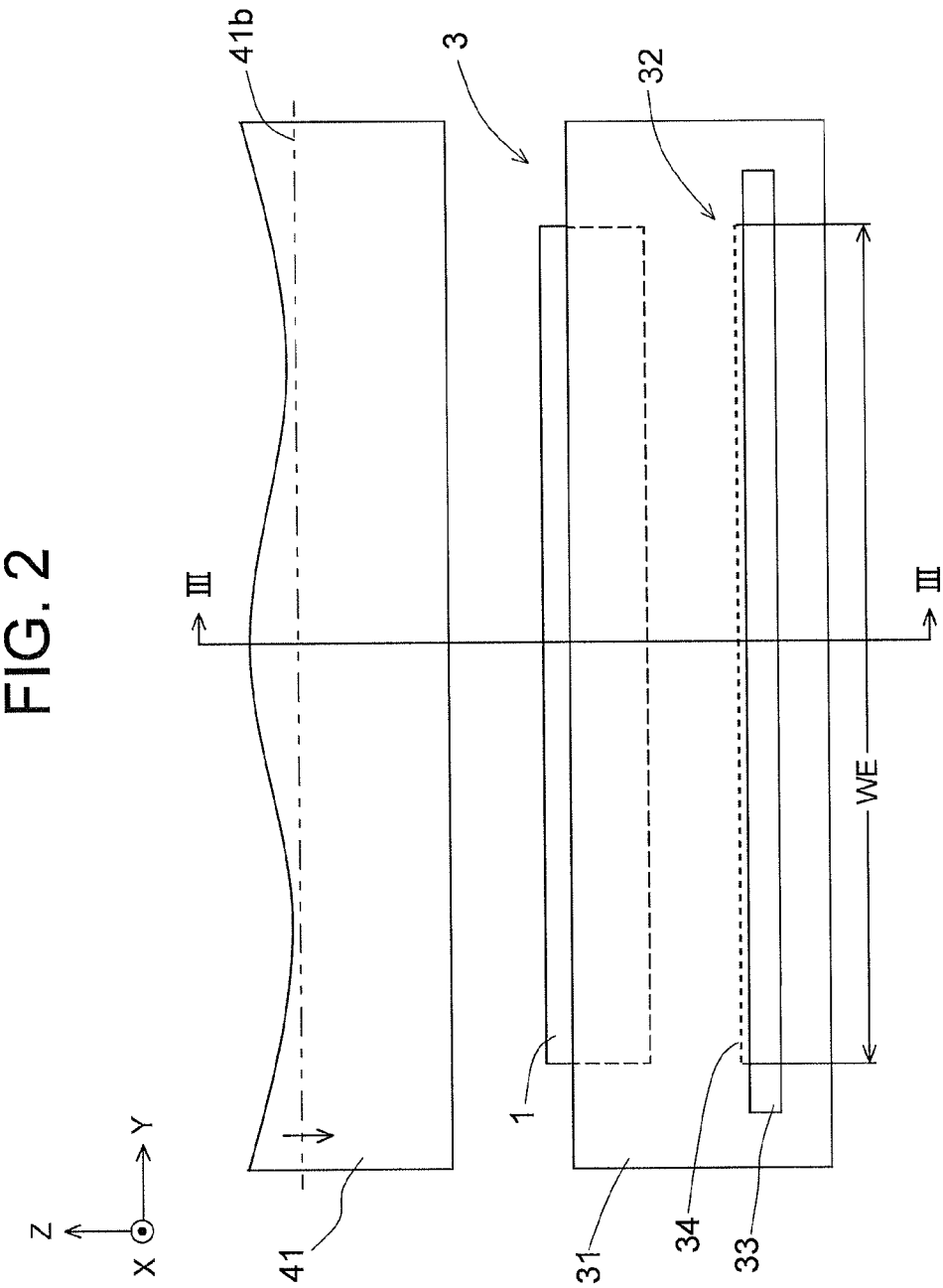
FIG. 2 is a schematic view showing an LED head and a photosensitive drum as seen from a positive side of an X-axis, i.e., in an orientation opposite to that in FIG. 1.

FIG. 2 is a schematic view showing the LED head 3 and the photosensitive drum 41 as seen from a positive side of the X-axis, i.e., in an orientation opposite to that in FIG. 1. The photosensitive drum 41 rotates in a direction shown by an arrow in FIG. 2.

The LED head 3 includes a lens unit 1, a holder 31, and an LED array 32. The holder 31 holds the lens unit 1 and the LED array 32 in a predetermined positional relationship described later. The LED array 32 (i.e., a light emitting portion) includes LED elements 34 (i.e., light emitting elements) arranged along a substantially straight line on a circuit board 33. The LED array 32 is held so that an arrangement direction of the LED elements 34 is parallel with the Y-axis direction (i.e., a direction of the rotation axis 41b of the photosensitive drum 41). The lens unit 1 is held so that a longitudinal direction of the lens unit 1 is parallel with the LED array 32. In a particular example, a length WE (FIG. 2) of the LED array 32 is set to 208 mm.

Therefore, the LED head 3 is disposed so that the arrangement direction of the LED elements 34 of the LED array 32 and the longitudinal direction of the lens unit 1 are parallel with the rotation axis 41b of the photosensitive drum 41 (i.e., the Y-axis direction).

Figure 3:
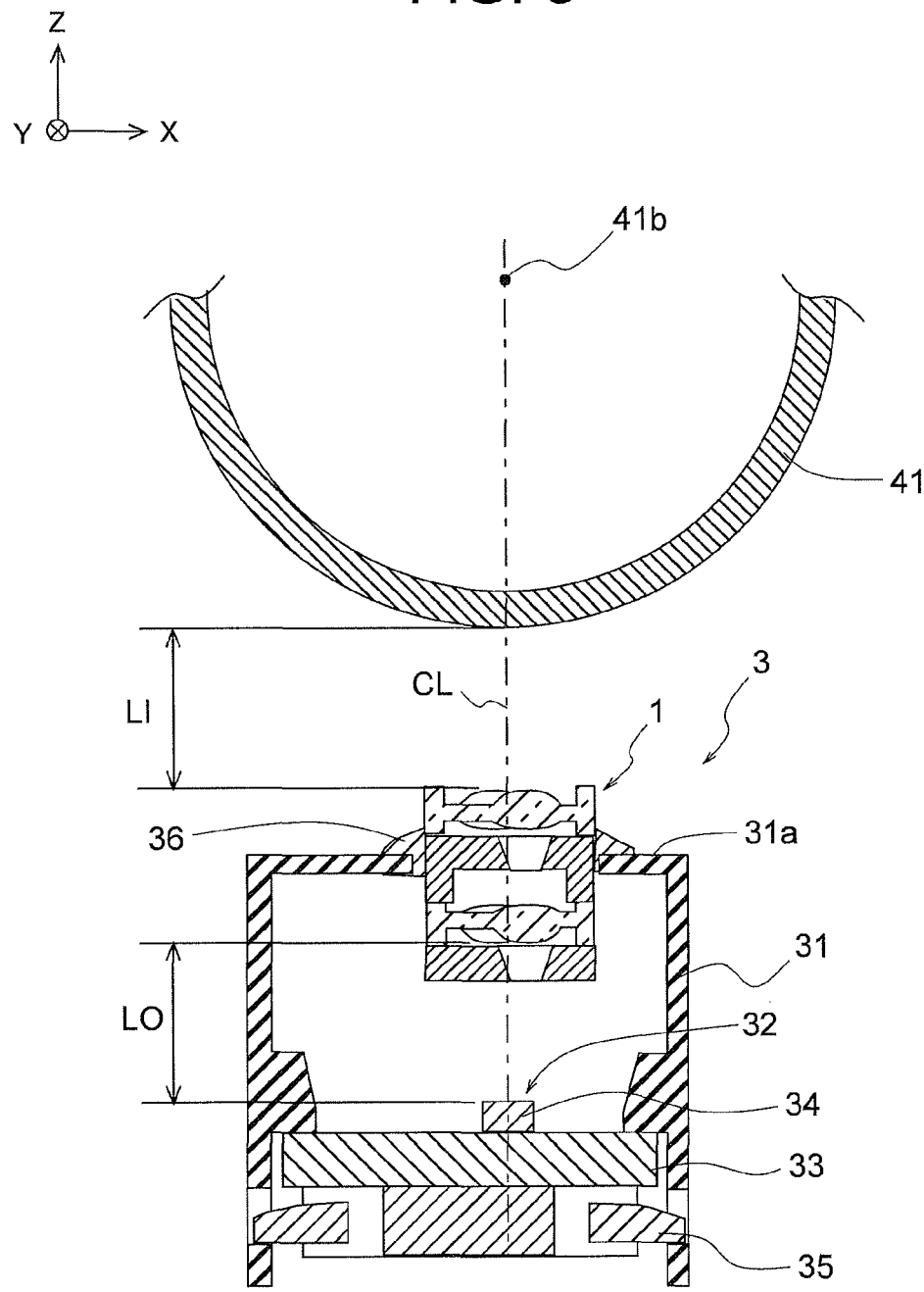
FIG. 3 is a sectional view taken along line in FIG. 2.

FIG. 3 is a sectional view taken along line in FIG. 2. As shown in FIG. 3, a center of the lens unit 1 in a widthwise direction of the lens unit 1 (i.e., the X-axis direction) is expressed as CL. A center of the LED element 34 and the rotation axis 41b of the photosensitive drum 41 are located on an extrapolated straight line of the center CL of the lens unit 1 in the widthwise direction. A direction of a light beam incident on and emitted from the lens unit 1 is the Z-axis direction. Here, the widthwise direction of the lens unit 1 (i.e., the X-axis direction) is a horizontal direction.

The lens unit 1 is fitted into a holding opening formed on a top surface part 31a of the holder 31, and is fixed using adhesive agent or the like. The holding opening extends in a longitudinal direction of the holder 31. A seal member 36 seals between the holder 31 and the lens unit 1, and prevents leakage of light through a gap between the holder 31 and the lens unit 1. The LED elements 34 are arranged on the circuit board 33. The circuit board 33 is supported by the base 35, and is fixed to the holder 31.

In a state where the LED head 3 is disposed so as to face the photosensitive drum 41, a distance LO from an emission surface of the LED element 34 to an opposing lens surface of the lens unit 1 is the same as a distance LI from the surface of the photosensitive drum 41 to an opposing lens surface of the lens unit 1 (i.e., LI=LO). In this regard, an arrangement of respective parts of the LED head 3 will be described in detail later.

Figure 4:
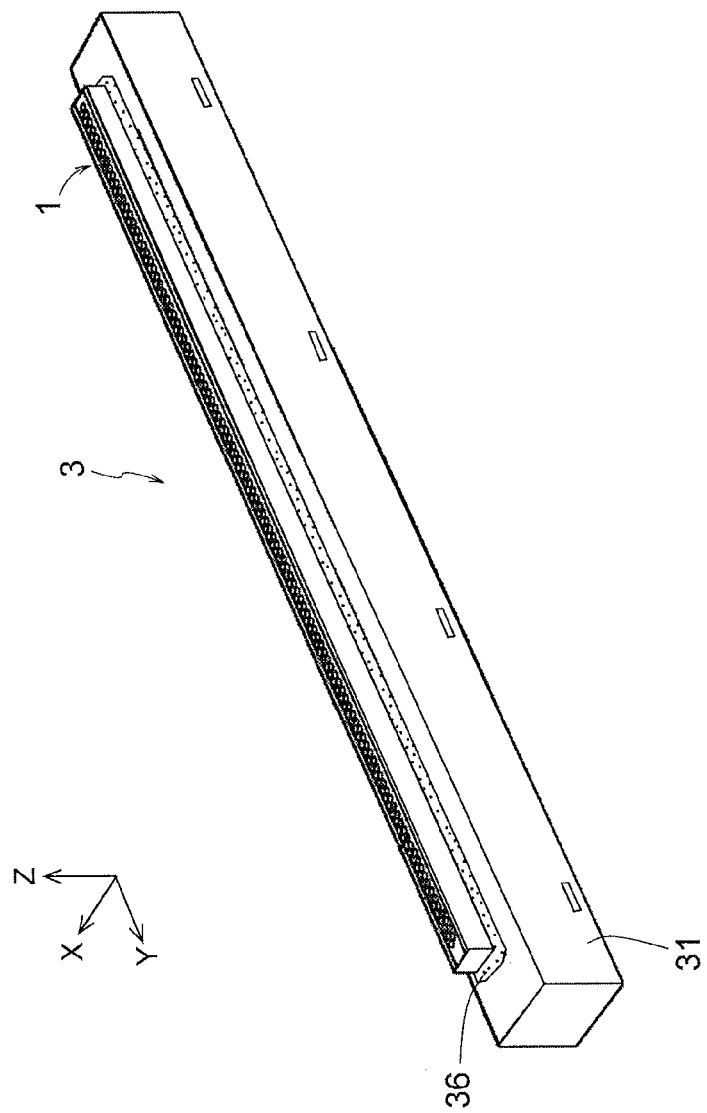
FIG. 4 is an external perspective view showing the LED head.
Figure 5:
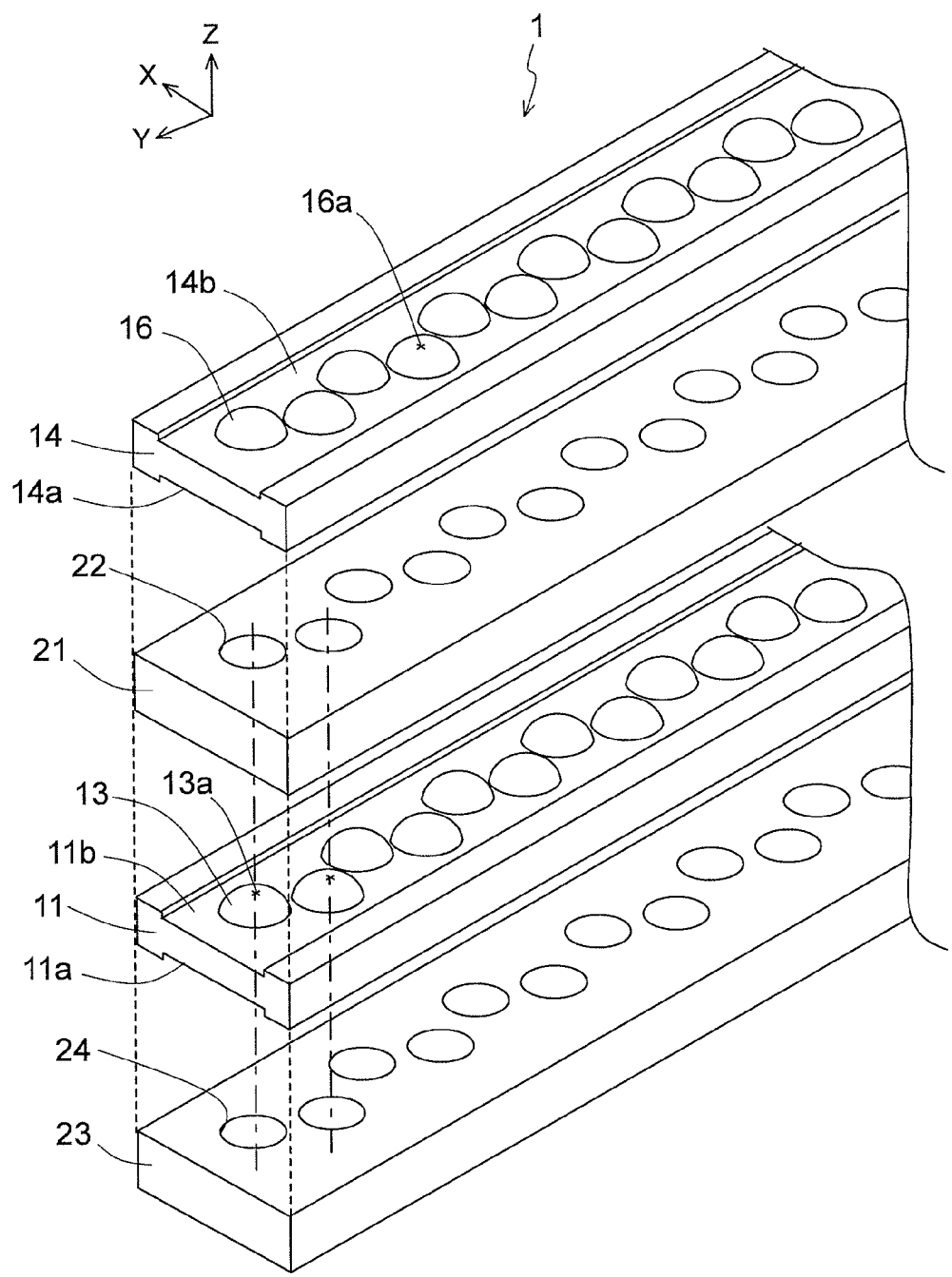
FIG. 5 is an exploded perspective view showing an end portion of a lens unit.

FIG. 4 is an external perspective view of the LED head 3. FIG. 5 is an enlarged perspective view showing an end portion of the lens unit 1.

The LED head 3 includes the lens unit 1. The lens unit 1 is fixed by the holder 31, and is disposed so that a direction of the light beam incident on and emitted from the lens unit 1 is the Z-axis direction. In other words, the light beam from the LED array 32 passes the lens unit 1 in the Z-axis direction. The seal member 36 is provided so as to fill the gap between the holder 31 and the lens unit 1. In a particular example, the LED head 3 has a resolution of 600 dpi. That is, in the LED array 32, 600 LED elements 34 (see FIG. 2) are arranged per inch. 1inch corresponds to approximately 25.4 mm. That is, the arrangement pitch (PD) of the LED elements 34 is 0.042333 mm. Further, in a particular example, a central value of a light emission wavelength of the LED elements 34 is 770 nm.

Next, a configuration of the lens unit 1 will be described. As shown in FIG. 5, the lens unit 1 includes a mask 23 as a first light shielding plate, a first lens plate 11 as a first lens array, a light shielding plate 21 as a second light shielding plate, and a second lens plate 14 as a second lens array. The mask 23, the first lens plate 11, the light shielding plate 21 and the second lens plate 14 are arranged in this order from a side (i.e., an incident side) closer to the LED elements 34 (FIG. 3), and overlap each other in the Z-axis direction. The LED elements 34 are disposed below the lens unit 1 (i.e., a negative side of the Z-axis).

A plurality of lens surfaces 13 are arranged in two rows on a back surface 1ib of the first lens plate 11 on the photosensitive drum 41 side (i.e., a positive side of the Z-axis). A plurality of lens surfaces 16 are arranged in two rows on a back surface 14b of the second lens plate 14 on the photosensitive drum 41 side (i.e., the positive side of the Z-axis). A plurality of openings 22 (i.e., second openings) are formed on the light shielding plate 21. A plurality of openings 24 (i.e., first openings) are formed on the mask 23. The lens surfaces 13, the openings 22 and the openings 24 are respectively arranged at the same intervals so that surface apexes 13a of the lens surfaces 13, the openings 22 and the openings 24 are aligned with each other in the Z-axis direction. The light shielding plate 21 and the mask 23 are foiiued of material that blocks a light beam emitted by the LED element 34 (FIG. 3).

A plurality of lens surfaces 12 (FIG. 8) are fol. Led at predetermined positions on a face surface 11a of the first lens plate 11 on the LED elements 34 side (i.e., the negative side of the Z-axis). A plurality of lens surfaces 15 (FIG. 8) are formed at predetermined positions on a face surface 14a of the second lens plate 14 on the LED elements 34 side (i.e., the negative side of the Z-axis).

Figure 6:
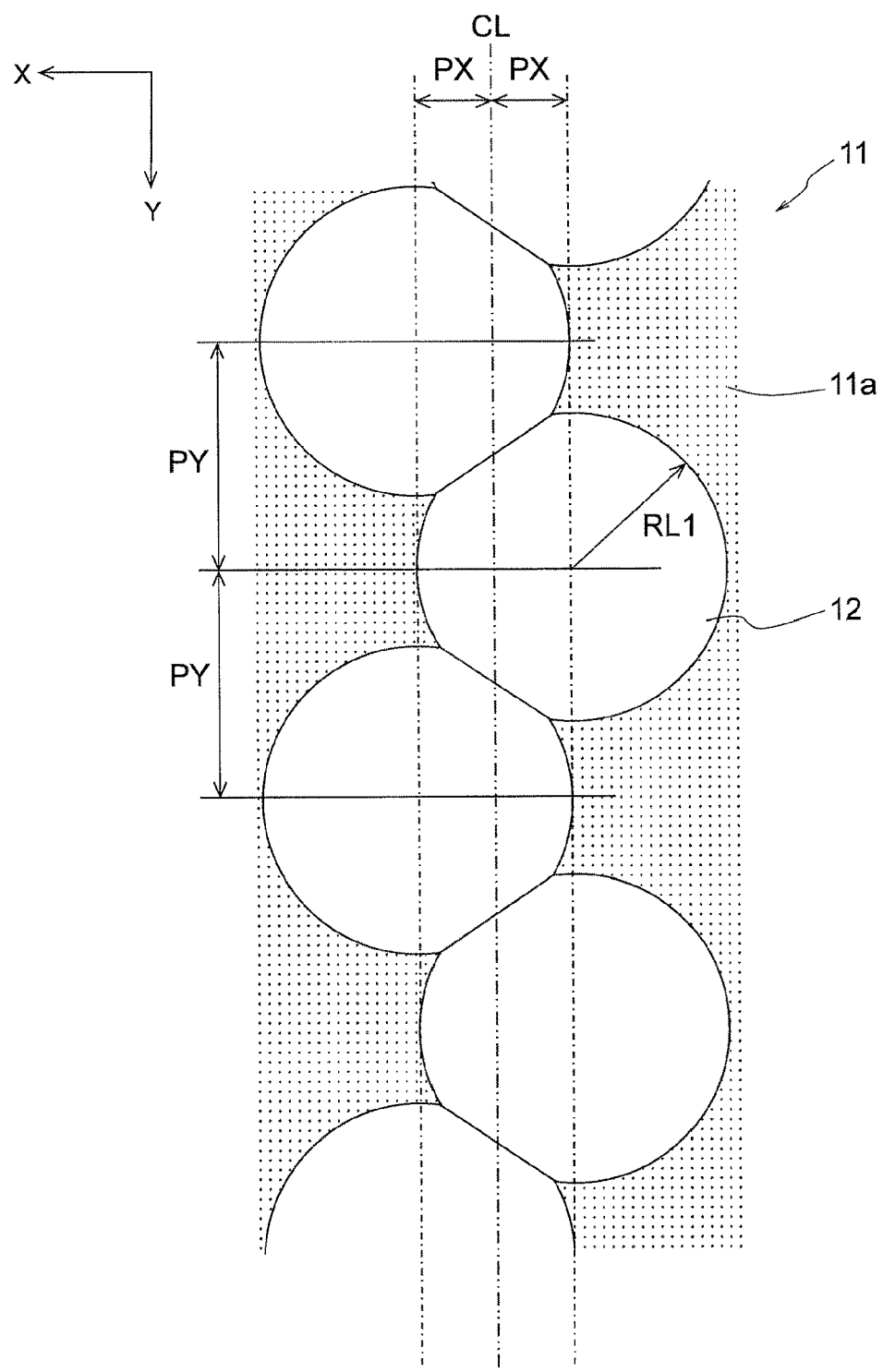
FIG. 6 is a view showing lens surfaces on a face surface of a first lens plate shown in FIG. 5 as seen through from a positive side of a Z-axis.
Figure 7:
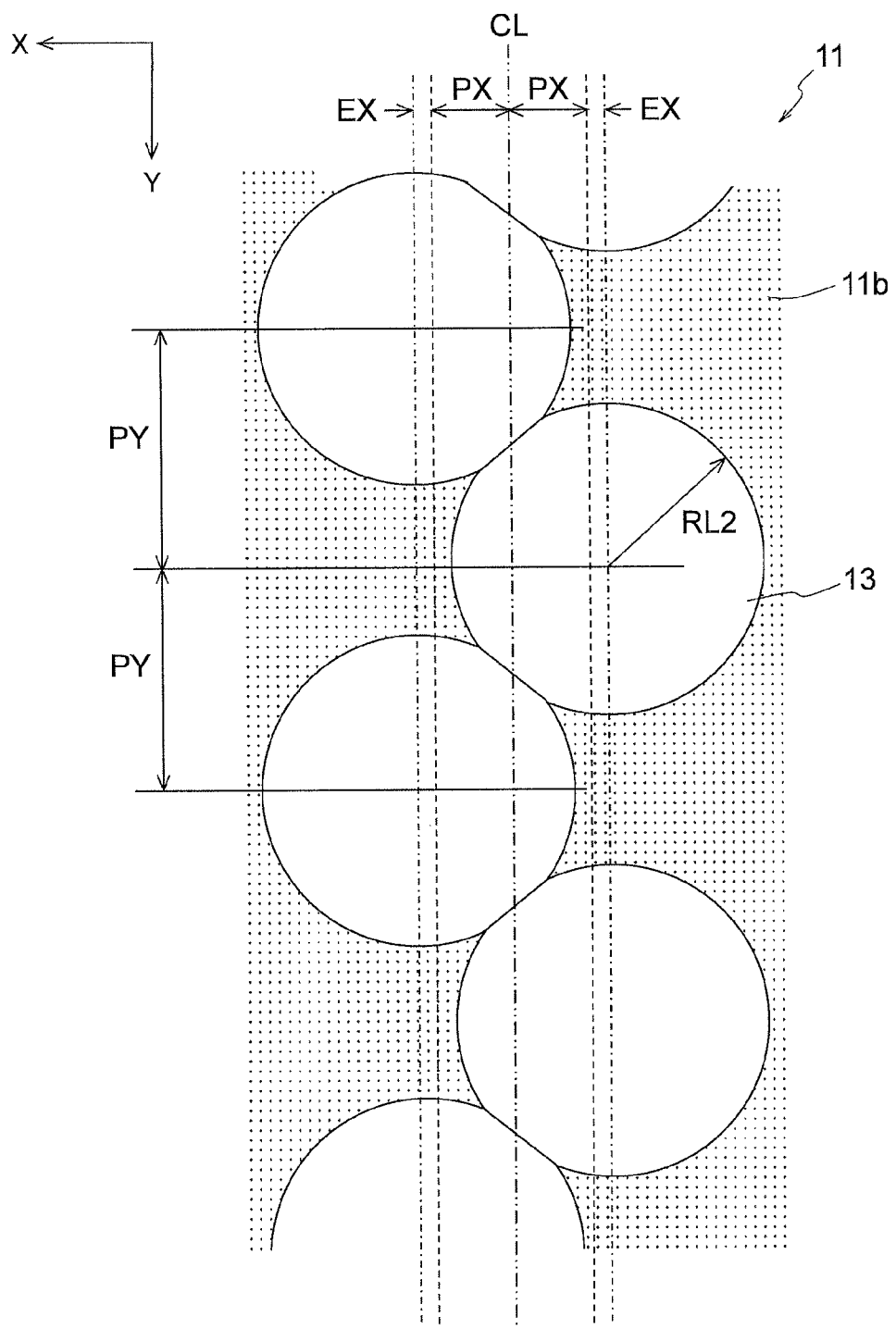
FIG. 7 is a view showing lens surfaces on a back surface of the first lens plate shown in FIG. 5 as seen from the positive side of the Z-axis.

FIG. 6 is a view showing an arrangement of the lens surfaces 12 formed on the face surface 11a of the first lens plate 11 as seen through from above in FIG. 5 (i.e., from the positive side of the Z-axis). FIG. 7 is a view showing an arrangement of the lens surfaces 13 formed on the back surface 11b of the first lens plate 11 as seen from above in FIG. 5 (i.e., from the positive side of the Z-axis). A configuration of the first lens plate 11 will be described with reference to FIGS. 6 and 7.

As shown in FIG. 6, a plurality of lens surfaces 12 are arranged in two rows in a staggered manner on the face surface 11a of the first lens plate 11. An arrangement interval of the adjacent lens surfaces 12 in the arrangement direction (i.e., the Y-axis direction) is expressed as PY. An arrangement interval of the lens surfaces 12 of each row is double the arrangement interval PY (i.e., 2×PY). Further, the lens surfaces 12 of two rows are disposed on both sides of the center CL of the lens unit in the widthwise direction (i.e., the X-axis direction). Centers of the lens surfaces 12 of each row are distanced from the center CL in the widthwise direction by a distance PX. Each lens surface 12 has a radius RL1. The face surface 11a of the first lens plate 11 is a flat surface except for regions where the lens surfaces 12 are formed.

As shown in FIG. 7, a plurality of lens surfaces 13 are arranged in two rows in a staggered manner on the back surface 1ib of the first lens plate 11. An arrangement interval of the adjacent lens surfaces 13 in the arrangement direction (i.e., the Y-axis direction) is expressed as PY. An arrangement interval of the lens surfaces 13 of each row is double the arrangement interval PY (i.e., 2×PY). Further, the lens surfaces 13 of two rows are disposed on both sides of the center CL of the lens unit in the widthwise direction (i.e., the X-axis direction). Centers of the lens surfaces 12 of each row are distanced from the center CL in the widthwise direction by a distance PX+EX. Each lens surface 13 has a radius RL2. The back surface 11b of the first lens plate 11 is a flat surface except for regions where the lens surfaces 13 are formed.

That is, in the arrangement direction (i.e., the Y-axis direction), the lens surfaces 13 on the back surface 11b of the first lens plate 11 are respectively disposed at the same positions as the lens surfaces 12 on the face surface 11a. In contrast, in the widthwise direction (i.e., the X-axis direction) of the first lens plate 11, the lens surfaces 13 on the back surface 11b of the first lens plate 11 are respectively disposed at positions farther from the center CL than the lens surfaces 12 on the face surface 11a by the distance EX. Here, a pair of lens surfaces 12 and 13 facing each other correspond to both surfaces of a lens (i.e., a first lens). The lens surface 12 is also referred to as a first incident surface, the lens surface 13 is also referred to as a first emission surface.

The lens surfaces 15 (FIG. 9) each having a radius RL2 are arranged on the face surface 14a of the second lens plate 14, and the lens surfaces 16 each having a radius RL1 are arranged on the back surface 14b of the second lens plate 14, as with the first lens plate 11. As seen from above in FIG. 5 (i.e., from the positive side of the Z-axis), the lens surfaces 15 (FIG. 9) on the face surface 14a of the second lens plate 14 are respectively disposed at the same positions as the lens surfaces 13 on the back surface 11b of the first lens plate 11 shown in FIG. 7. Further, the lens surfaces 16 on the back surface 14b of the second lens plate 14 are respectively disposed at the same positions as the lens surfaces 12 on the face surface 11a of the first lens plate 11 shown in FIG. 6. Here, a pair of lens surfaces 15 and 16 facing each other correspond to both surfaces of a lens (i.e., a second lens). The lens surface 15 is also referred to as a second incident surface, the lens surface 16 is also referred to as a second emission surface.

The first lens plate 11 and the second lens plate 14 are both formed of material that transmits a light beam. Further, the lens surfaces 12 and the lens surfaces 13 of the first lens plate 11 are famed integrally with other portions of the first lens plate 11. The lens surface 15 and the lens surface 16 are formed integrally with other portions of the second lens plate 14.

Figure 8:
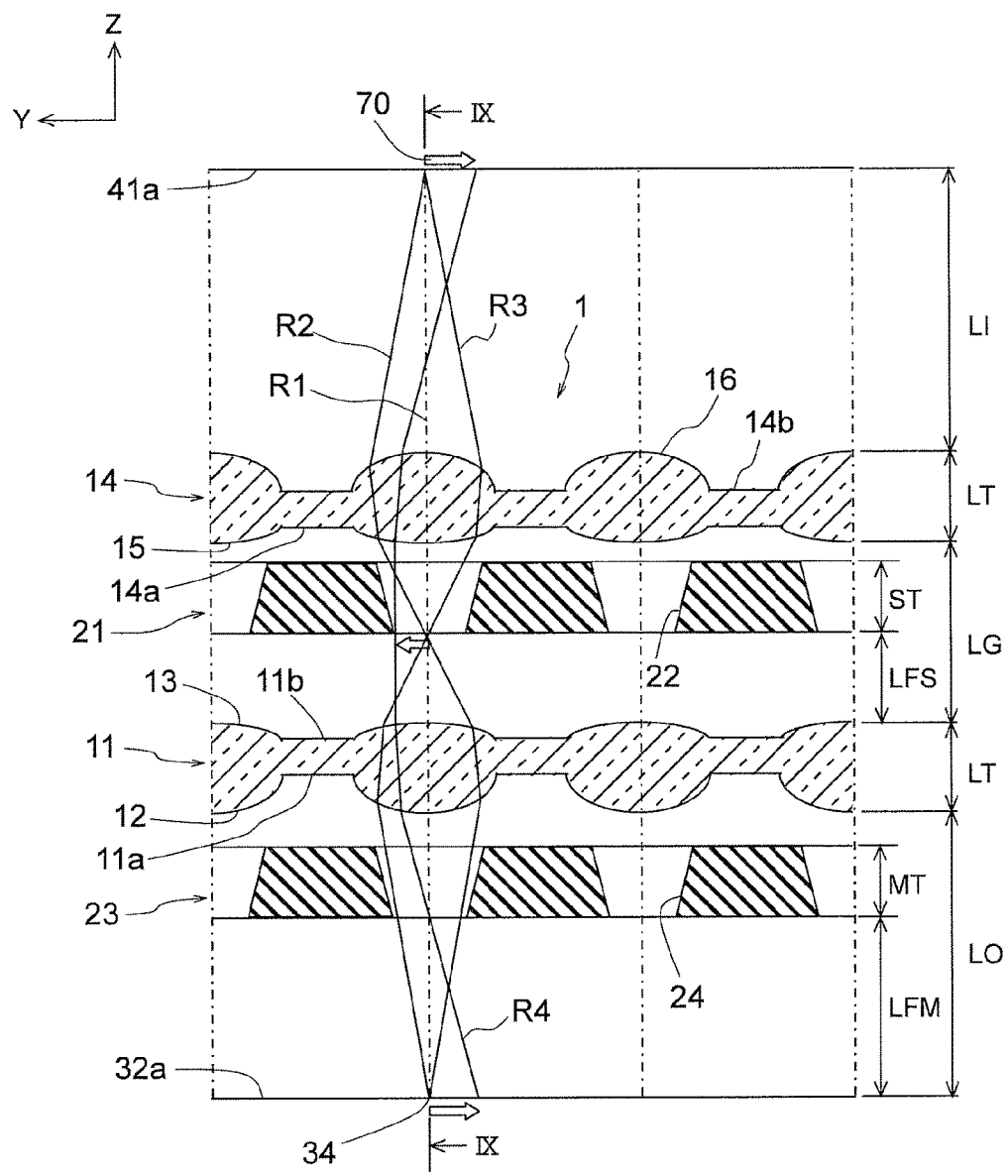
FIG. 8 is a sectional view showing the lens unit taken along a plane parallel with a ZX plane and passing through surface apexes of the lens surfaces.
Figure 9:
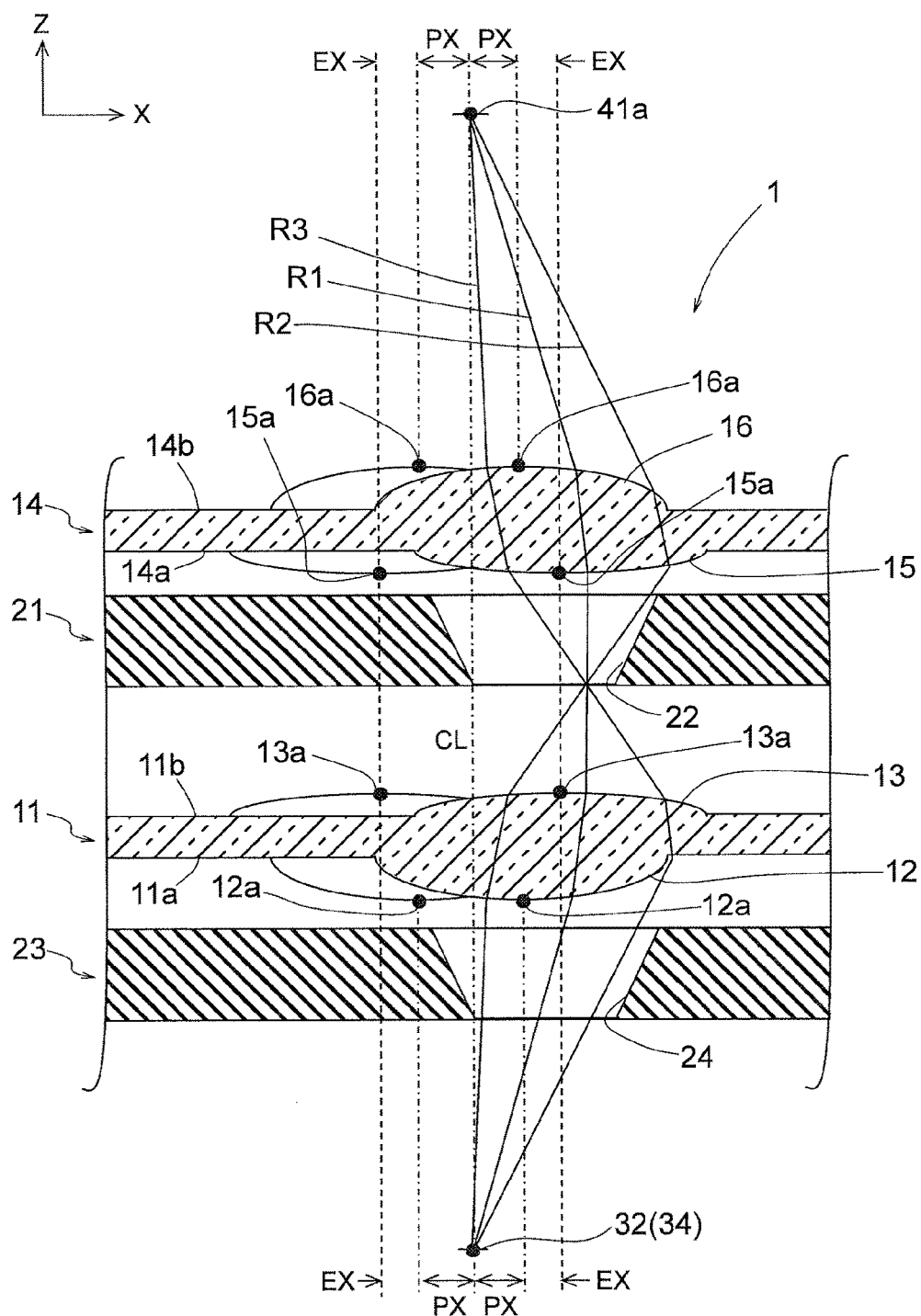
FIG. 9 is a sectional view taken along line IX-IX in FIG. 8.

FIG. 8 is a sectional view showing the lens unit 1 (for example, obtained by assembling the components shown in FIG. 5) taken along a plane passing through lens apexes 16a of the lens surfaces 16 and parallel to a YZ plane, and as seen from a negative side of the X-axis. FIG. 9 is a sectional view taken along line IX-IX in FIG. 8.

In FIG. 8, an emission surface 32a of the LED array 32 is disposed below (i.e., the negative side of the Z-axis) the mask 23. A drum surface 41a (as an imaging position) of the photosensitive drum 41 is disposed above (i.e., the positive side of the Z-axis) the second lens plate 14. Each of the mask 23 and the light shielding plate 21 is formed of a light shielding member that blocks unnecessary light (i.e., stray light and flare light) other than light beams that form an image of the LED array 32 (FIG. 2).

The openings 24 of the mask 23, the openings 22 of the light shielding plate 21, the lens surfaces 13 of the first lens plate 11, and the lens surfaces 15 of the second lens plate 14 are aligned with each other in the Z-axis direction (i.e., a direction in which the light beam is incident on and emitted from the lens unit 1). As described above, as seen from above (i.e., from the positive side of the Z-axis) in FIGS. 8 and 9, the lens surfaces 15 on the face surface 14a of the second lens plate 14 are respectively disposed at the same positions as the lens surfaces 13 on the back surface 11b of the first lens plate 11. The lens surfaces 16 on the back surface 14b of the second lens plate 14 are respectively disposed at the same positions as the lens surfaces 12 on the face surface 11a of the first lens plate 11.

As shown in FIG. 8, a distance from the emission surface 32a of the LED array 32 to the lens surface 12 of the first lens plate 11 is expressed as LO. A surface interval (i.e., a lens thickness) between the lens surface 12 and the lens surface 13 of the first lens plate 11 is expressed as LT. A surface interval between the lens surface 13 of the first lens plate 11 and the lens surface 15 of the second lens plate 14 is expressed as LG. A surface interval (i.e., a lens thickness) between the lens surface 15 and the lens surface 16 of the second lens plate 14 is expressed as LT. A surface interval between the lens surface 16 of the second lens plate 14 and the drum surface 41a (i.e., an imaging surface) of the photosensitive drum 41 is expressed as LI. Further, a surface interval between the emission surface 32a of the LED array 32 and the mask 23 is expressed as LFM. surface interval between the lens surface 13 of the first lens plate 11 and the light shielding plate 21 is expressed as LFS. A thickness of the mask 23 is expressed as MT. A thickness of the light shielding plate 21 is expressed as ST.

As shown in FIG. 9, the surface apexes 16a of the lens surfaces 16 (see FIG. 5) arranged in two rows on the back surface 14b of the second lens plate 14 are disposed on both sides of the center CL of the lens unit 1 (corresponding to the center of the lens array 32), and are distanced from the center CL by the distance PX in the X-axis direction. The surface apexes 12a of the lens surfaces 12 arranged in two rows on the face surface 11a of the first lens plate 11 are disposed on both sides of the center CL of the lens unit 1 (corresponding to the center of the lens array 32), and are distanced from the center CL by the distance PX in the X-axis direction. The surface apexes 13a of the lens surfaces 13 (see FIG. 5) arranged in two rows on the back surface 11b of the first lens plate 11 are disposed on both sides of the center CL of the lens unit 1, and are distanced from the center CL by the distance PX+EX in the X-axis direction. The surface apexes 15a of the lens surfaces 15 arranged in two rows on the face surface 14a of the second lens plate 14 are disposed on both sides of the center CL of the lens unit 1, and are distanced from the center CL by the distance PX+EX in the X-axis direction. Positions of the openings 22 and 24 in the X-axis direction are substantially aligned with the position of the surface apexes 13a of the lens surfaces 13 in the X-axis direction.

In this regard, a center of the LED array 32 in the X-axis direction is on the center CL of the lens unit 1 in the widthwise direction of the lens unit 1.

Figure 10:
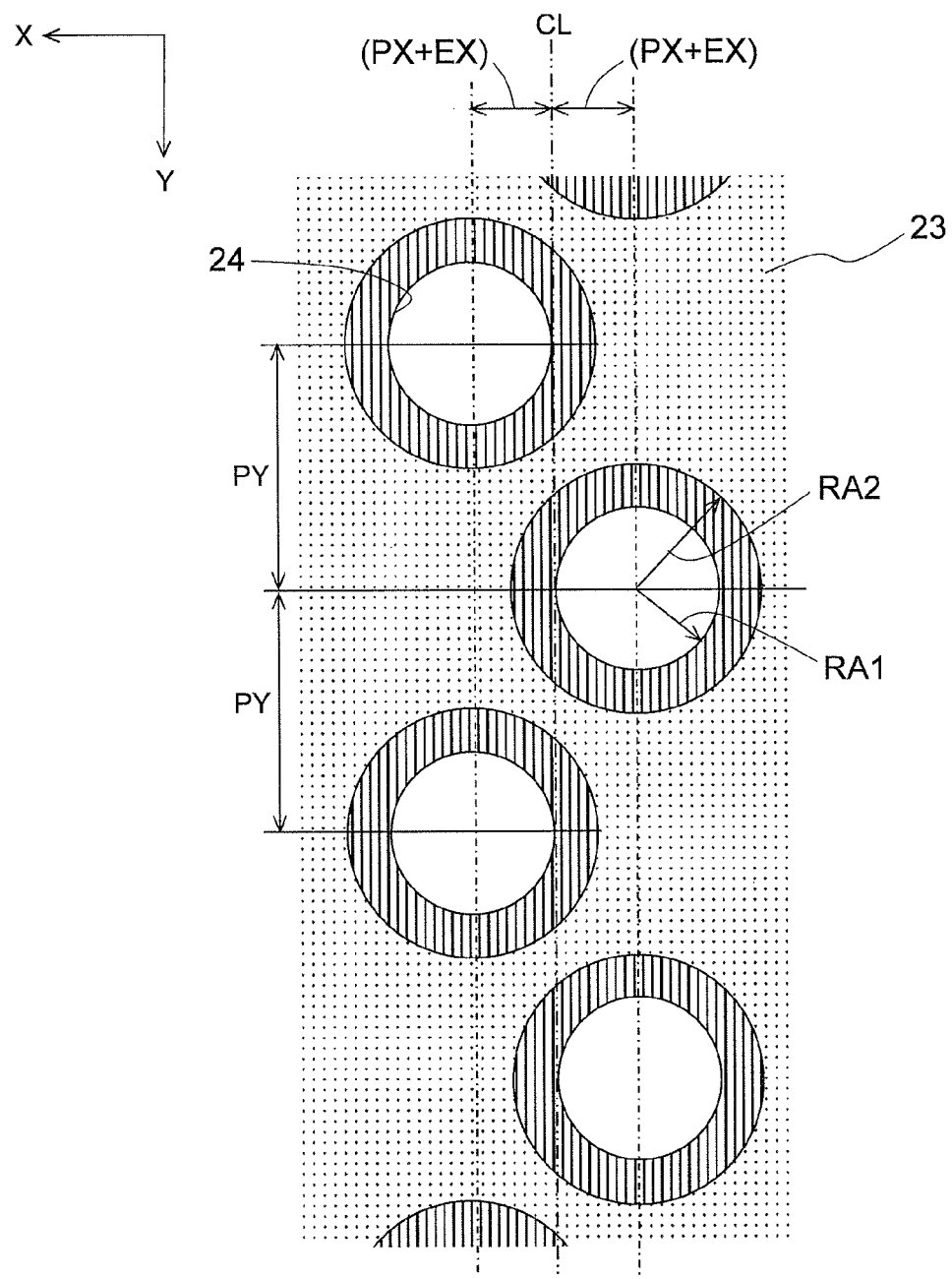
FIG. 10 is a view showing openings formed on a mask as seen from the positive side of the Z-axis.
Figure 11:
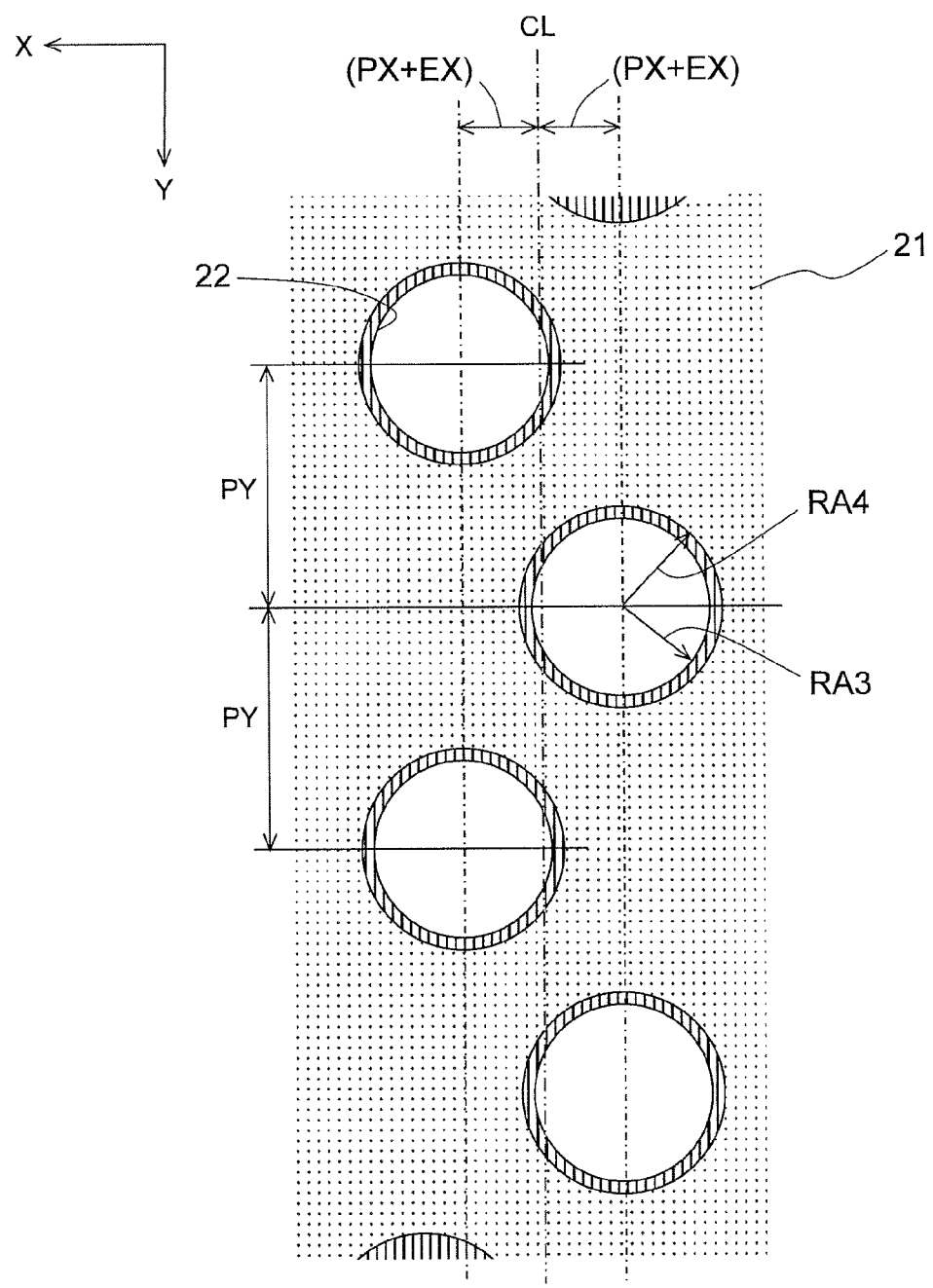
FIG. 11 is a view showing openings formed on a light shielding plate as seen from the positive side of the Z-axis.

FIG. 10 is a view showing an arrangement of the openings 24 of the mask 23 as seen from above in FIG. 5 (i.e., from the positive side of the Z-axis). FIG. 11 is a view showing an arrangement of the openings 22 of the light shielding plate 21 as seen from above in FIG. 5 (i.e., from the positive side of the Z-axis). Configurations of the mask 23 and the light shielding plate 21 will be described with reference to FIGS. 10 and 11.

As shown in FIG. 10, the mask 23 includes a plurality of openings 24 arranged in two rows in a staggered manner. An arrangement interval of the adjacent openings 24 in the arrangement direction (i.e., the Y-axis direction) is expressed as PY. An arrangement interval of the openings 24 of each row is double the arrangement interval PY (i.e., 2×PY). Further, centers of the openings 24 of the respective rows are disposed on both sides of the center of the mask 23 in the widthwise direction (corresponding to the center CL of the lens unit 1 in the X-axis direction), and are distanced from the center CL by the distance PX+EX in the X-axis direction. Each opening 24 has a circular shape. Each opening 24 has a radius RA1 at a surface facing the LED array 32, and a radius RA2 at a surface facing the first lens plate 11 (FIG. 5). The radius RA1 is smaller than the radius RA2. That is, the opening 24 has a truncated cone shape. The mask 23 is formed of material that blocks the light beam emitted by the LED array 32.

Further, as shown in FIG. 11, the light shielding plate 21 includes a plurality of openings 22 arranged in two rows in a staggered manner. An arrangement interval of the adjacent openings 22 in the arrangement direction (i.e., the Y-axis direction) is expressed as PY. An arrangement interval of the openings 22 of each row is double the arrangement interval PY (i.e., 2×PY). Further, centers of the openings 22 of the respective rows are disposed on both sides of the center of the light shielding plate 21 in the widthwise direction (corresponding to the center CL of the lens unit 1 in the X-axis direction), and are distanced from the center CL by the distance PX+EX in the X-axis direction. Each opening 22 has a circular shape. Each opening 22 has a radius RA3 at a surface facing the first lens plate 11, and a radius RA4 at a surface facing the second lens plate 14. The radius RA3 is smaller than the radius RA4. That is, the opening 22 has a truncated cone shape. The light shielding plate 21 is formed of material that blocks the light beam emitted by the LED array 32.

The lens unit 1 is configured so that the centers of the openings 24 of the mask 23 and the centers of the openings 22 of the light shielding plate 21 are positioned on the substantially same straight lines with the surface apexes 13a of the lens surface 13 of the first lens plate 11 and the surface apexes 15a of the lens surfaces 15 of the second lens plate 14 in the Z-axis direction (i.e., the direction in which the light beam is incident on and emitted from the lens unit 1).

An operation of the color printer 90 having the above described configuration will be described with reference to FIG. 1. First, an image forming operation will be described.

In each of the toner image forming units 92, 93, 94 and 95, the surface of the photosensitive drum 41 is charged by the charging roller 42 applied with a charging voltage by a not shown power source. As the photosensitive drum 41 rotates in a direction shown by the arrow in FIG. 1, the charged surface of the photosensitive drum 41 reaches a position facing the LED head 3. The surface of the photosensitive drum 41 is exposed with light emitted by the LED head 3, and an electrostatic latent image is formed on the surface of the photosensitive drum 41. The electrostatic latent image is developed by the developing device 52, and a toner image is formed on the surface of the photosensitive drum 41.

The recording sheet 91 stored in the sheet cassette 60 is fed out from the sheet cassette 60 by the feed roller 61, and is conveyed by the conveying rollers 62 and 63 to reach the transfer belt 81. When the developed toner image on the surface of the photosensitive drum 41 reaches the vicinity of the transfer roller 80 and the transfer belt 81 by the rotation of the photosensitive drum 41, the toner image is transferred from the photosensitive drum 41 to a surface of the recording sheet 91 (conveyed by the transfer belt 81) by the transfer roller 80 applied with a transfer voltage by a not shown power source. The toner images of yellow (Y), magenta (M), cyan (C) and black (K) formed by the toner image forming units 92, 93, 94 and 95 are transferred to the recording sheet 91 in a superimposed manner.

Then, the recording sheet 91 with the transferred toner images of respective colors is conveyed to the fixing device 53 by a rotation of the transfer belt 81. The fixing device 53 applies heat and pressure to the toner image on the recording sheet 91, and causes the toner image to be molten and fixed to the recording sheet 91. The recording sheet 91 with the fixed toner image is conveyed and ejected by the conveying rollers 64 and the ejection rollers 65, and is placed on the ejection portion 66. In this way, the image forming operation on the recording sheet 91 is completed.

Next, an operation of the LED head 3 will be described with reference to FIGS. 3 and 8. When a selected LED element 34 of the LED array 32 emits a light beam of a predetermined amount based on image data, the light beam from the LED element 34 is incident on the lens unit 1, and is focused on the photosensitive drum 41.

As shown in FIGS. 8 and 9, the light beam emitted by the LED element 34 in the vicinity of an optical axis of the lens surface 12 reaches the drum surface 41a via light paths R1, R2, R3 and the like. The light beam emitted by the LED element 34 distanced from the optical axis of the lens surface 12 reaches the drum surface 41a via, for example, a light path R4 as shown in FIG. 8. That is, the light beam emitted by the LED array 32 is incident on the lens surface 12, forms a reduced inverted image at a substantially intermediate position between the lens surfaces 13 and 15, is incident on the lens surface 15, and forms a magnified inverted image of the reduced inverted image. That is, the lens unit 1 forms an erecting equal-magnification image 70 of the LED array 32 on an imaging position.

Next, description will be made of an evaluation test for examining occurrence of vertical streaks (also referred to as periodic streaks). The test is performed by preparing a plurality of LED heads having lens units 1 on different conditions as test pieces.

TABLE 1 shows dimensions of respective parts (see FIGS. 8 and 9) of the lens unit 1 of the LED head 3 of Embodiment 1 prepared as a test piece. In addition to the dimensions shown in TABLE 1, the distance EX (FIG. 9) of the lens unit 1 of Embodiment 1 is set to 20 μm (i.e., EX=20 μm).

Further, an LED head using a lens unit of Comparison Example 1 is prepared as a test piece. The distance EX of the lens unit of the LED head of Comparison Example 1 is set to 0 (i.e., EX=0).

Dimensions of the respective parts of the lens unit of the LED head of Comparison Example 1 except for the distance EX are the same as those of Embodiment 1 shown in TABLE 1.

In this regard, the distance LO of the LED head 3 of Embodiment 1 (used as the test piece) is set to 3.8 mm (i.e., LO=3.8 mm).

TABLE 1

| ITEM | DIMENSION (mm) |
| --- | --- |
| LT (LENS THICKNESS) | 1.3 |
| LG (INTERVAL) | 2.2 |
| PX (DISTANCE) | 0.18 |
| PY (DISTANCE) | 1.2 |
| RL1 (RADIUS) | 0.75 |
| RL2 (RADIUS) | 0.6 |
| MT (THICKNESS) | 1.0 |
| LFM (INTERVAL) | 1.9 |
| RA1 (OPENING RADIUS) | 0.35 |
| RA2 (OPENING RADIUS) | 0.6 |
| ST (THICKNESS) | 1.0 |
| LFS (INTERVAL) | 1.1 |
| RA3 (OPENING RADIUS) | 0.45 |
| RA4 (OPENING RADIUS) | 0.48 |

As described above, LT represents the thickness (more specifically, a maximum thickness) between the lens surfaces of each of the lens plates 11 and 14. LG represents the surface interval between the lens surface 13 and the lens surface 15. PX represents the distance from the center CL of the lens unit 1 to the surface apex of each of the lens surfaces 12 and 16 in the X-axis direction. PY represents the arrangement interval of the lens surfaces 12, 13, 15 and 16 in the Y-axis direction. RL1 represents the radius of each of the lens surfaces 12 and 16. RL2 represents the radius of each of the lens surfaces 13 and 15. MT represents the thickness of the mask 23. LFM represents the surface interval between the emission surface 32a of the LED array 32 and the mask 23. RA1 represents the smaller radius of the opening 24. RA2 represents the larger radius of the opening 24. ST represents the thickness of the light shielding plate 21. LFS represents the surface interval between the lens surface 13 of the first lens plate 11 and the light shielding plate 21. RA3 represents the smaller radius of the opening 22. RA4 represents the larger radius of the opening 22.

Next, shapes of the lens surfaces of the lens unit 1 of Embodiment 1 (prepared as the test piece) and lens surfaces of the lens unit of Comparison Example 1 (prepared as the test piece) will be described with reference to TABLE 2.

The lens surfaces of the lens unit 1 of Embodiment 1 and the lens surfaces of the lens unit of Comparison Example 1 are rotational aspheric surfaces, and are expressed using radii of curvatures and aspherical coefficients of fourth, sixth and eighth order. The lens surfaces 16 have the same shapes as the lens surfaces 12. To be more specific, the lens surfaces 16 have shapes obtained by rotating the lens surfaces 12 by 180 degrees about an axis in the X-axis direction (i.e., the widthwise direction of the lens unit 1). The lens surfaces 15 have the same shapes as the lens surfaces 13. To be more specific, the lens surfaces 15 have shapes obtained by rotating the lens surfaces 13 by 180 degrees about an axis in the X-axis direction. In each of the lens unit 1 of Embodiment 1 and the lens unit of Comparison Example 1 prepared as the test pieces, the lens surfaces are arranged through a length of 212 mm in the arrangement direction of the lens surfaces (i.e., the Y-axis direction).

The light shielding plate 21 and the mask 23 are formed of polycarbonate resin "Iupilon H-4000" manufactured by Mitsubishi Engineering Plastic Corporation (Iupilon is a trademark of Mitsubishi Engineering Plastic Corporation).

Figure 12:
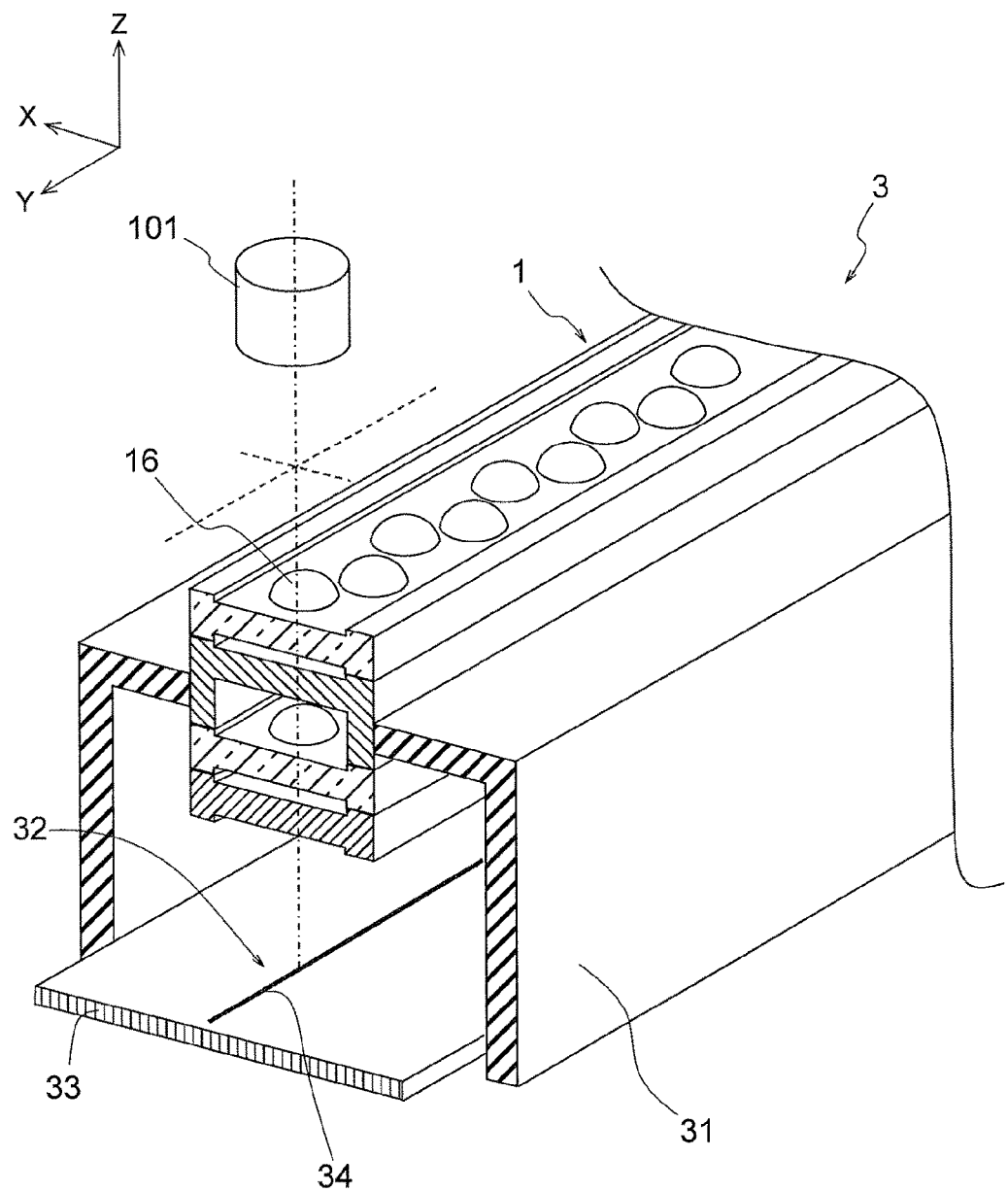
FIG. 12 is a perspective view showing a part of the LED head and a photosensor of an optical image measuring device for measuring a light amount of the LED head.
Figure 13:
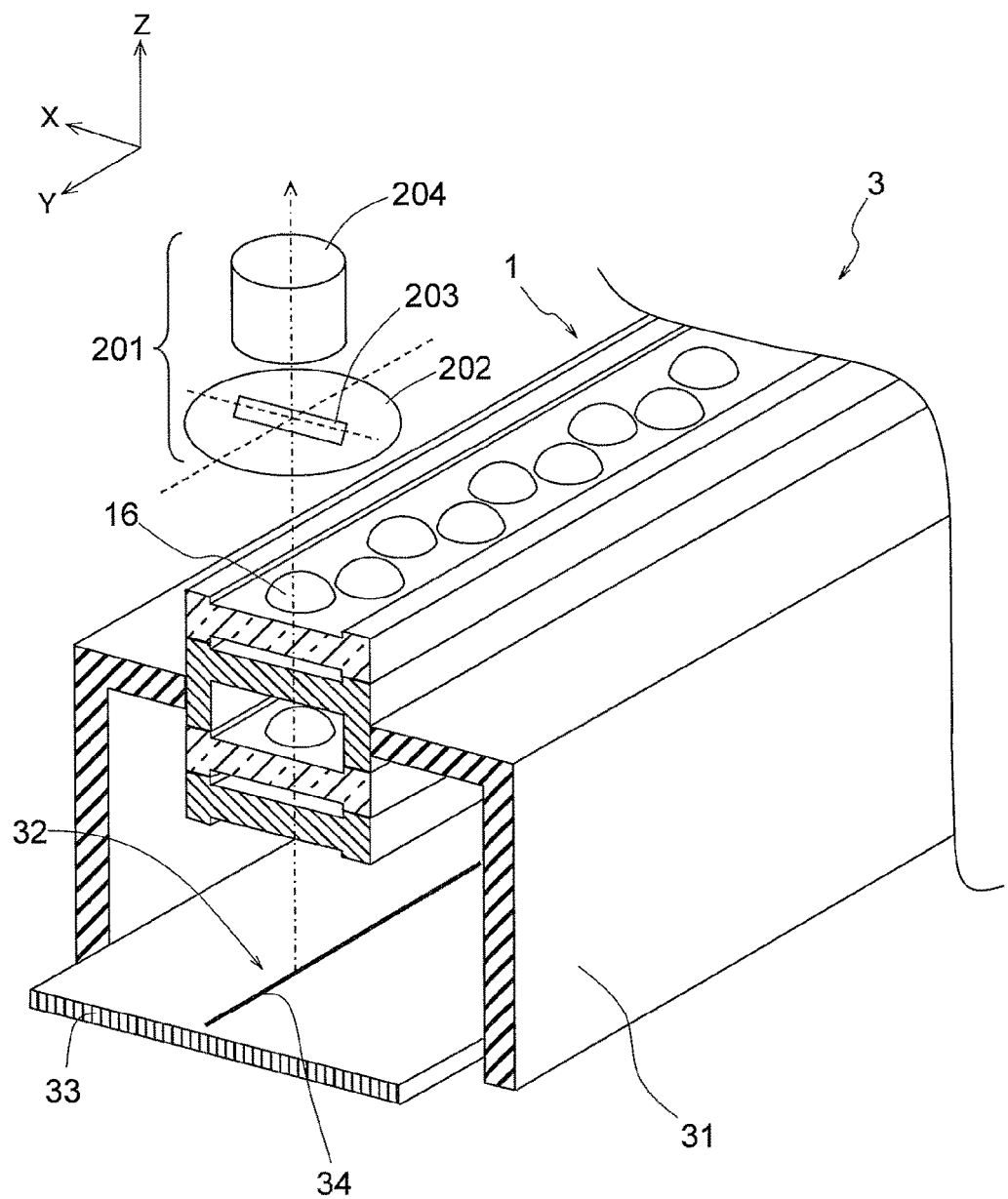
FIG. 13 is a perspective view showing a part of the LED head and a slit sensor of the optical image measuring device for measuring a slit wavelength of the LED head.

Next, an optical image measuring device for measuring optical characteristics of the LED head 3 will be described with reference to FIGS. 12 and 13. FIG. 12 is a schematic perspective view showing a part of the LED head 3 and a photosensor 101 of the optical image measuring device for measuring a light amount of the LED head 3. FIG. 13 is a schematic perspective view showing a part of the LED head 3 and a slit sensor 201 of the optical image measuring device for measuring a slit waveform of the LED head 3.

In FIG. 12, the photosensor 101 of the optical image measuring device measures a light amount of an image formed by each LED element 34 of the lens unit 1 of the LED head 3 at a position (i.e., an imaging surface) at the distance LI from the lens surface 16 on the photosensitive drum 41 side. For this purpose, the optical image measuring device controls movement of the photosensor 101 and light emission of the LED elements 34. To be more specific, the optical image measuring device moves the photosensor 101 in the longitudinal direction of the LED head 3 (i.e., the Y-axis direction) and adjusts a position of the photosensor 101 in the Y-axis direction so as to align the photosensor 101 with an imaging position of the LED element 34 of the LED head 3 driven to emit light in order.

In FIG. 13, the slit sensor 201 of the optical image measuring device includes a light shielding plate 202 having a slit 203, and a photosensor 204. The light shielding plate 202 is configured so that the slit 203 is selectively orientable in the widthwise direction of the lens unit 1 (i.e., the X-axis direction) perpendicular to the arrangement direction of the LED elements 34 (i.e., the Y-axis direction), and in a direction of 45 degrees with respect to the arrangement direction of the LED elements 34 (i.e., the Y-axis direction). The light beam passing through the slit 203 is incident on the photosensor 204, and is converted an electric signal by the photosensor 204.

For this reason, the optical image measuring device controls movement of the slit sensor 201 and light emission

TABLE 2

| LENS SURFACE | ITEM | LENS UNIT 1 OF EMBODIMENT 1 | LENS UNIT OF COMPARISON EXAMPLE 1 |
|---|---|---|---|
| LENS SURFACE 12 | RADIUS OF CURVATURE | 0.90135 | 0.917836 |
| | 4TH ORDER ASPHERICAL COEFFICIENT | −0.350571 | −0.431908 |
| | 6TH ORDER ASPHERICAL COEFFICIENT | −0.49056 | 0.00626385 |
| | 8TH ORDER ASPHERICAL COEFFICIENT | 0.456567 | −0.473374 |
| LENS SURFACE 13 | RADIUS OF CURVATURE | 0.967019 | 0.947869 |
| | 4TH ORDER ASPHERICAL COEFFICIENT | −0.349876 | −0.334183 |
| | 6TH ORDER ASPHERICAL COEFFICIENT | 0.569144 | 0.408968 |
| | COEFFICIENT | −0.907441 | −0.560749 |

The first lens plate 11 and the second lens plate 14 are formed of cycloolefin resin "ZEONEX E48R" manufactured by Nippon Zeon Corporation (ZEONEX is a trademark of Nippon Zeon Corporation). A refractive index n of this material is 1.5247 (n=1.5247) at a wavelength of 770 nm of the LED element 34.

of the LED head 3 so as to move the slit sensor 201 in the longitudinal direction of the LED head 3 (i.e., the Y-axis direction), and measures a light amount distribution of an image formed by each of the LED elements 34 driven to emit light in order. Hereinafter, the slit 203 oriented in the X direction (i.e., 90 degrees with respect to the Y-axis direction) may be referred to as a "90-degree slit 203a". The slit 203 oriented in the direction of 45 degrees with respect to the Y-axis direction may be referred to as a "45-degree slit 203b".

An operation of the optical image measuring device will be further described.

First, the optical image measuring device is provided with a configuration using the photosensor 101 as shown in FIG. 12, and performs a light amount correction for uniformizing light amounts of all dots of the LED head 3. The optical image measuring device drives the respective LED elements 34 of the LED head 3 to emit light on a dot-by-dot basis (one by one) using currents of the constant current value, and measures the light amount of each dot using the photosensor 101. Then, based on the measured light amounts of all the LED elements 34, current values for the respective LED elements 34 are calculated so as to uniformize the light amounts of all the LED elements 34. The calculated current values are referred to as light amount correction values.

Then, the optical image measuring device is provided with a configuration using the slit sensor 201 as shown in FIG. 13, and measures beam diameters of all dots of the LED head 3. The optical image measuring device drives the respective LED elements 34 of the LED head 3 to emit light on a dot-by-dot basis (one by one) using currents of the light amount correction values, and measures a slit waveform of an image formed by each LED element 34 using the slit sensor 201. The slit waveform is a waveform of an image formed by the LED element 34. Then, an average value of peaks of the measured slit wavelengths of the respective LED elements 34 is calculated. A width of the slit waveform at a height of 10% of the average value of the peaks is referred to as a beam diameter. Hereinafter, the beam diameter measured using the 90-degree slit 203a may be referred to as a "90-degree beam diameter". The beam diameter measured using the 45-degree slit 203b may be referred to as a "45-degree beam diameter".

Figure 15A:
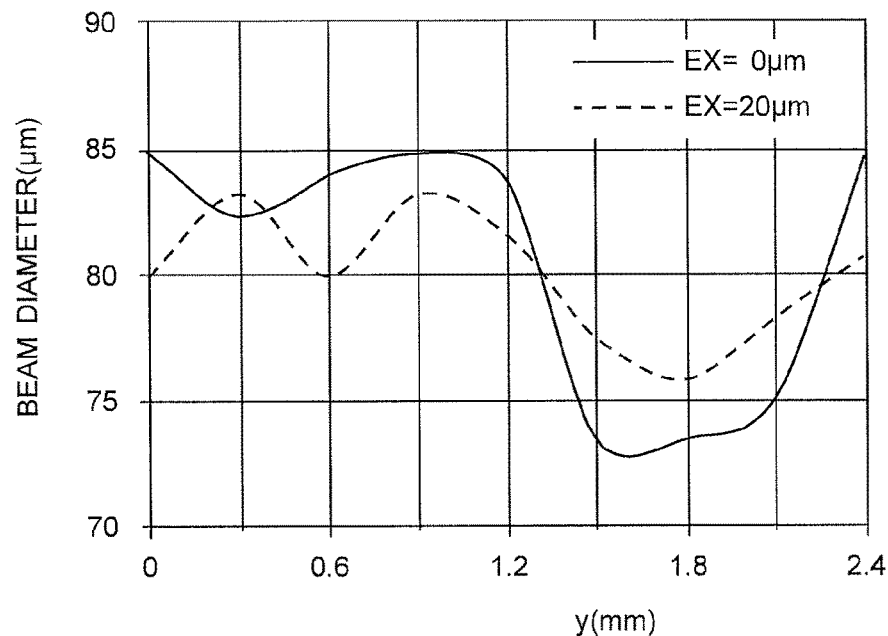
FIG. 15A is a graph showing beam diameters of respective dots of the LED head of Embodiment 1 and the LED head of Comparison Example 1 measured using a 45-degree slit with respect to the distance y (mm) from the predetermined position in the arrangement direction of the LED elements.
Figure 15B:
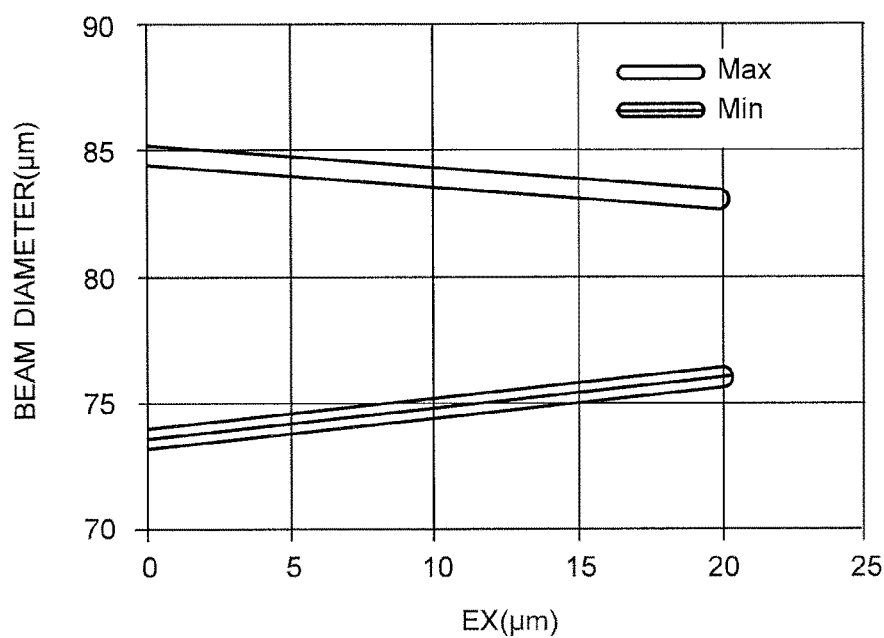
FIG. 15B is a graph showing maximum and minimum values of beam diameters of the LED head of Embodiment 1 and the LED head of Comparison Example 1 measured using the 45-degree slit with respect to the distance EX.

FIGS. 15A and 15B are graphs showing beam diameters (μm) of respective dots of the LED head 3 having the lens unit 1 of Embodiment 1 in which the distance EX is 20 μm and the LED head having the lens unit of Comparison Example 1 in which the distance EX is 0, which are measured using the 45-degree slit 203b.

In FIG. 15A, a horizontal axis indicates a distance y (mm) from a predetermined position in the arrangement direction of the LED elements 34 (i.e., the Y-axis direction). A vertical axis indicates a 45-degree beam diameter (μm) at each position. In this regard, a range from 0 mm to 2.4 mm on the horizontal axis corresponds to double the arrangement interval PY (i.e., 1.2 mm) of the lens surfaces 12, 13, 15 and 16 in the Y-axis direction.

As shown in FIG. 15A, regarding the LED head of Comparison Example 1 in which the distance EX is 0, a minimum value and a maximum value of the 45-degree beam diameter are respectively 73 μm and 85 μm. In contrast, regarding the LED head of Embodiment 1 in which the distance EX is 20 μm, a minimum value and a maximum value of the 45-degree beam diameter are respectively 76 μm and 83 μm. Therefore, a changing amount of the 45-degree beam diameter is smaller in the LED head 3 of Embodiment 1 than in the LED head of Comparison Example 1.

In FIG. 15B, a horizontal axis indicates the distance EX, and a vertical axis indicates a maximum value and a minimum value of the 45-degree beam diameter for each distance EX. In a range of the distance EX from 0 to 20 μm (i.e., 0≤EX≤20 μm), the changing amount of the 45-degree beam diameter decreases as the distance EX increases. This is because the increase in the distance EX causes a change in arrangement of the lens surfaces in the widthwise direction of the lens unit 1 (i.e., the X-axis direction), and results in changes in the beam shapes in the widthwise direction of the lens unit 1 (i.e., the X-axis direction).

Figure 14A:
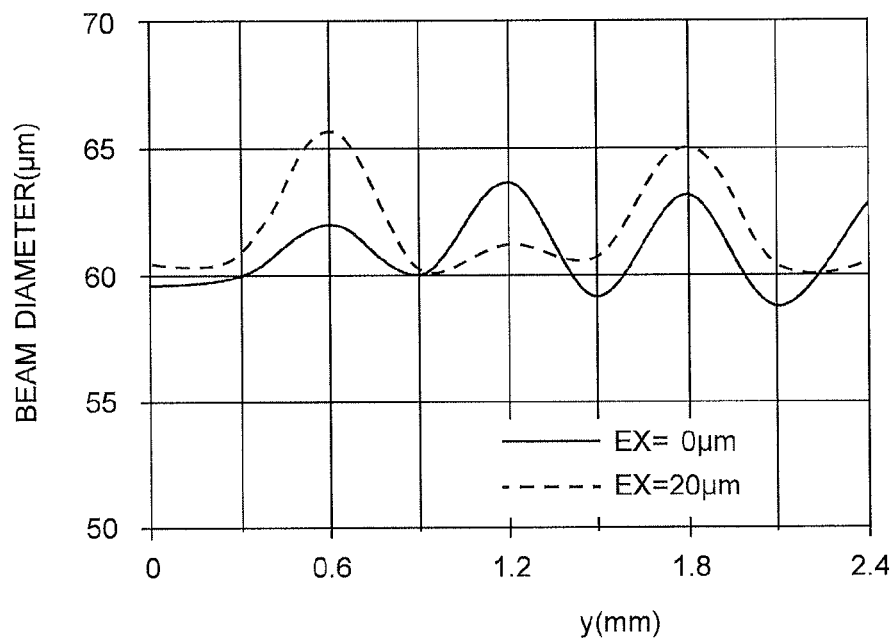
FIG. 14A is a graph showing beam diameters of respective dots of the LED head of Embodiment 1 and an LED head of Comparison Example 1 measured using a 90-degree slit with respect to a distance y (mm) from a predetermined position in an arrangement direction of LED elements.
Figure 14B:
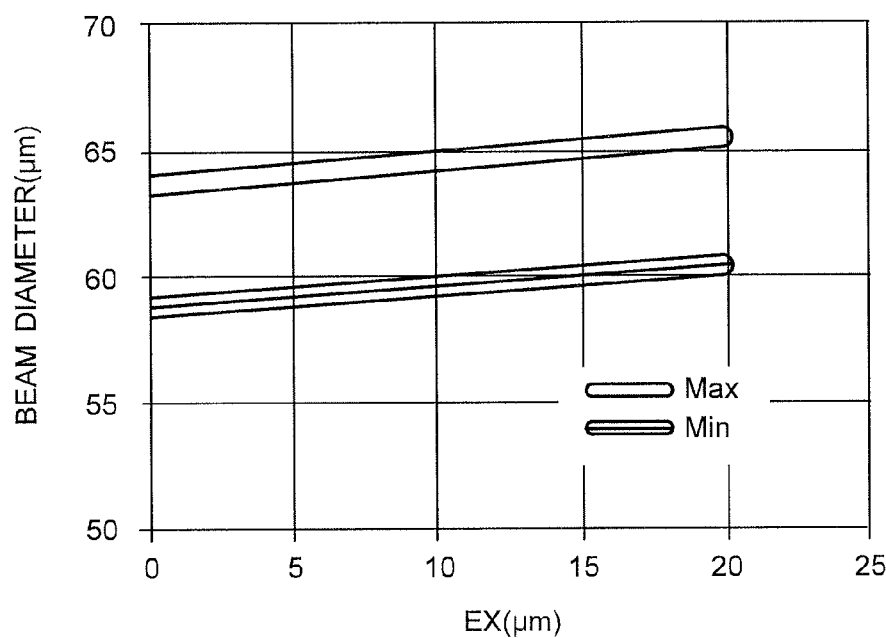
FIG. 14B is a graph showing maximum and minimum values of beam diameters of the LED head of Embodiment 1 and the LED head of Comparison Example 1 measured using the 90-degree slit with respect to a distance EX.

FIGS. 14A and 14B are graphs showing beam diameters (μm) of respective dots of the LED head 3 having the lens unit 1 of Embodiment 1 in which the distance EX is 20 μm and the LED head having the lens unit of Comparison Example 1 in which the distance EX is 0, which are measured using the 90-degree slit 203a.

In FIG. 14A, a horizontal axis indicates a distance y (mm) from a predetermined position in the arrangement direction of the LED elements 34 (i.e., the Y-axis direction). A vertical axis indicates a 90-degree beam diameter (μm) at each position. In this regard, a range from 0 mm to 2.4 mm on the horizontal axis corresponds to double the arrangement interval (i.e., 1.2 mm) of the lens surfaces 12, 13, 15 and 16 in the Y-axis direction.

As shown in FIG. 14A, regarding the LED head of Comparison Example 1 in which the distance EX is 0, a minimum value and a maximum value of the 90-degree beam diameter are respectively 58 μm and 63 μm. Regarding the LED head of Embodiment 1 in which the distance EX is 20 μm, a minimum value and a maximum value of the 90-degree beam diameter are respectively 60 μm and 65 μm. Therefore, a changing amount of the 90-degree beam diameter is 5 μm in both of the LED head of Embodiment 1 and the LED head of Comparison Example 1.

In FIG. 14B, a horizontal axis indicates the distance EX, and a vertical axis indicates a maximum value and a minimum value of the 90-degree beam diameter for each distance EX. In a range of the distance EX from 0 to 20 μm (i.e., 0≤EX≤20 μm), the changing amount of the 90-degree beam diameter is constantly about 5 μm. That is, the changing amount of the 90-degree beam diameter does not change even when the distance EX changes in both of Comparison Example 1 and Embodiment 1. The reason is as follows. The increase in the distance EX causes a change in arrangement of the lens surfaces in the widthwise direction of the lens unit 1 (i.e., the X-axis direction), but does not cause a change in arrangement of the lens surfaces in the arrangement direction of the LED elements 34 (i.e., the Y-axis direction). Therefore, the beam shape does not change in the arrangement direction of the LED elements 34 (i.e., the Y-axis direction).

Figure 16A:
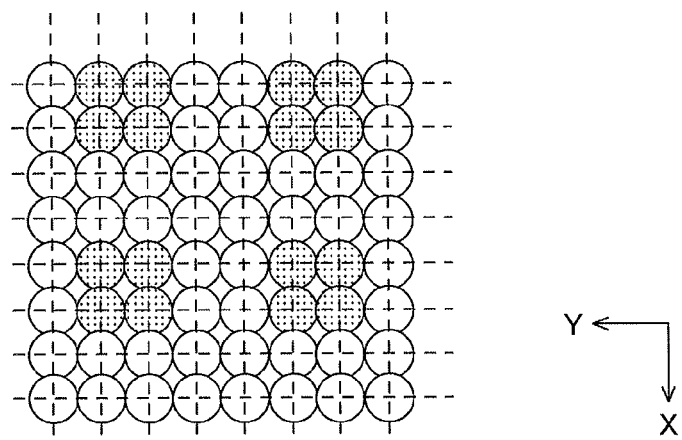
FIGS. 16A, 16B and 16C are schematic views showing printing patterns printed on a recording sheet in a printing test.
Figure 16B:
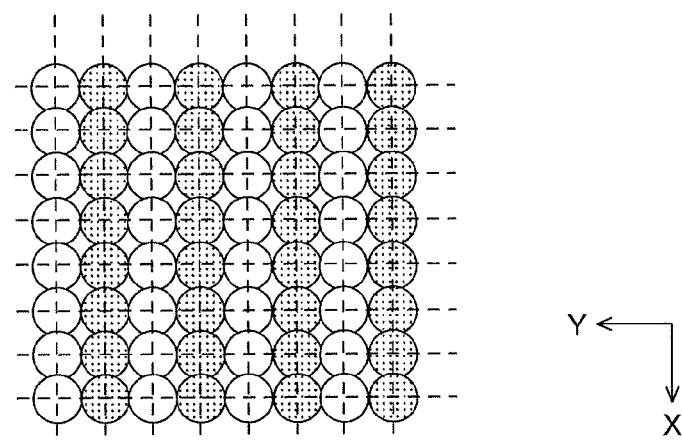
Figure 16C:
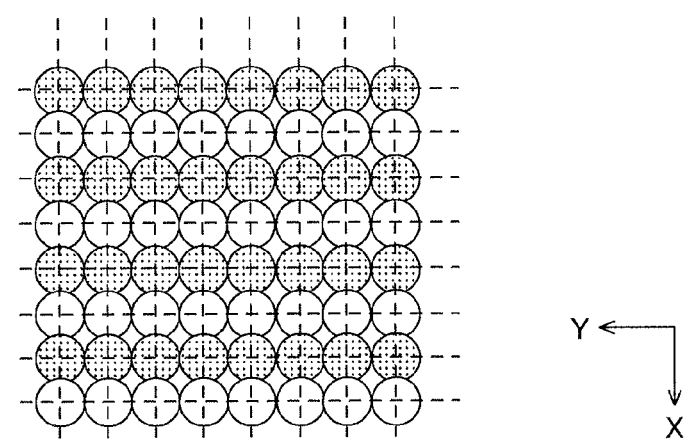

Next, description will be made of a printing test performed by respectively mounting the LED head 3 of Embodiment 1 and the LED head of the Comparison Example 1 to, for example, the color printer 90 shown in FIG. 1. Each of the LED heads of Embodiment 1 and Comparison Example 1 is configured for A4 size recording sheets, has a resolution of 600 dpi, and includes the LED array 32 having a length WE of 208 mm. FIGS. 16A, 16B and 16C are views showing printing patterns printed on the recording sheet in the printing test.

FIG. 16A shows a printing pattern (i.e., a 2-by-2 pattern) obtained by causing two of every four LED elements 34 in the arrangement direction of the LED elements 34 (i.e., the Y-axis direction) to form two dots (by emitting light) and two blanks (by not emitting light) alternately. FIG. 16B shows a printing pattern obtained by forming vertical thin lines in a conveying direction of the recording sheet (i.e., the X-axis direction) alternately in the Y-axis direction. FIG. 16O shows a printing pattern obtained by forming horizontal thin lines extending in the arrangement direction of the LED elements 34 (i.e., the Y-axis direction) alternately in the X-axis direction.

In the printing test, the LED head 3 of Embodiment 1 and the LED head of Comparison Example 1 are respectively mounted to the color printer 90, and the above described patterns are printed on the recording sheet. Then, the printed images are observed to evaluate vertical streaks and unevenness of density. When neither vertical streaks nor unevenness of density is observed, the evaluation result is "excellent". As a result of evaluation, the image printed by the color printer 90 to which the LED head 3 of Embodiment 1 is mounted is excellent. In contrast, vertical streaks occur on the image printed by the color printer 90 to which the LED head of Comparison Example 1 is mounted, and an interval of the vertical streaks corresponds to the arrangement interval PY (i.e., 1.2 mm) of the lens surfaces 12, 13, 15 and 16.

As described above, the LED head 3 of Embodiment 1 includes the first lens plate 11 disposed on the LED array 32 side and the second lens plate 14 disposed on the photosensitive drum 41 side as shown by way of example in FIG. 9. The first lens plate 11 includes the face surface 11a on which the lens surfaces 12 are arranged in two rows in a staggered manner, and the back surface 11b on which the lens surfaces 13 are arranged in two rows in a staggered manner. The second lens plate 14 includes the face surface 14a on which the lens surfaces 15 are arranged in two rows in a staggered manner, and the back surface 14b on which the lens surfaces 16 are arranged in two rows in a staggered manner.

Further, the lens surfaces 12, 13, 15 and 16 are configured so that the distance PX from the common center CL (i.e., the center of the lens unit 1 in the widthwise direction) to the lens surface 12 is smaller than the distance PX+EX from the center CL to the lens surface 13, and so that the distance PX from the center CL to the lens surface 16 is smaller than the distance PX+EX from the center CL to the lens surface 15.

With such a configuration, the LED head 3 of Embodiment 1 of the present invention can reduce the changing amount of the beam diameter in the widthwise direction of the LED head 3. Accordingly, the color printer 90 of Embodiment 1 can suppress occurrence of vertical streaks (at intervals corresponding to the arrangement interval of the lens surfaces) on the printed image.

As described above, according to the LED head 3 of Embodiment 1 of the present invention, the changing amount of the beam diameter in the widthwise direction of the LED head 3 can be reduced. Therefore, the occurrence of the vertical streaks (at intervals corresponding to the arrangement interval PY of the lens surfaces) on the printed image can be suppressed.

Embodiment 2

Embodiment 2 is intended to determine a range of the distance EX of the LED head 3 described in Embodiment 1.

Figure 17:
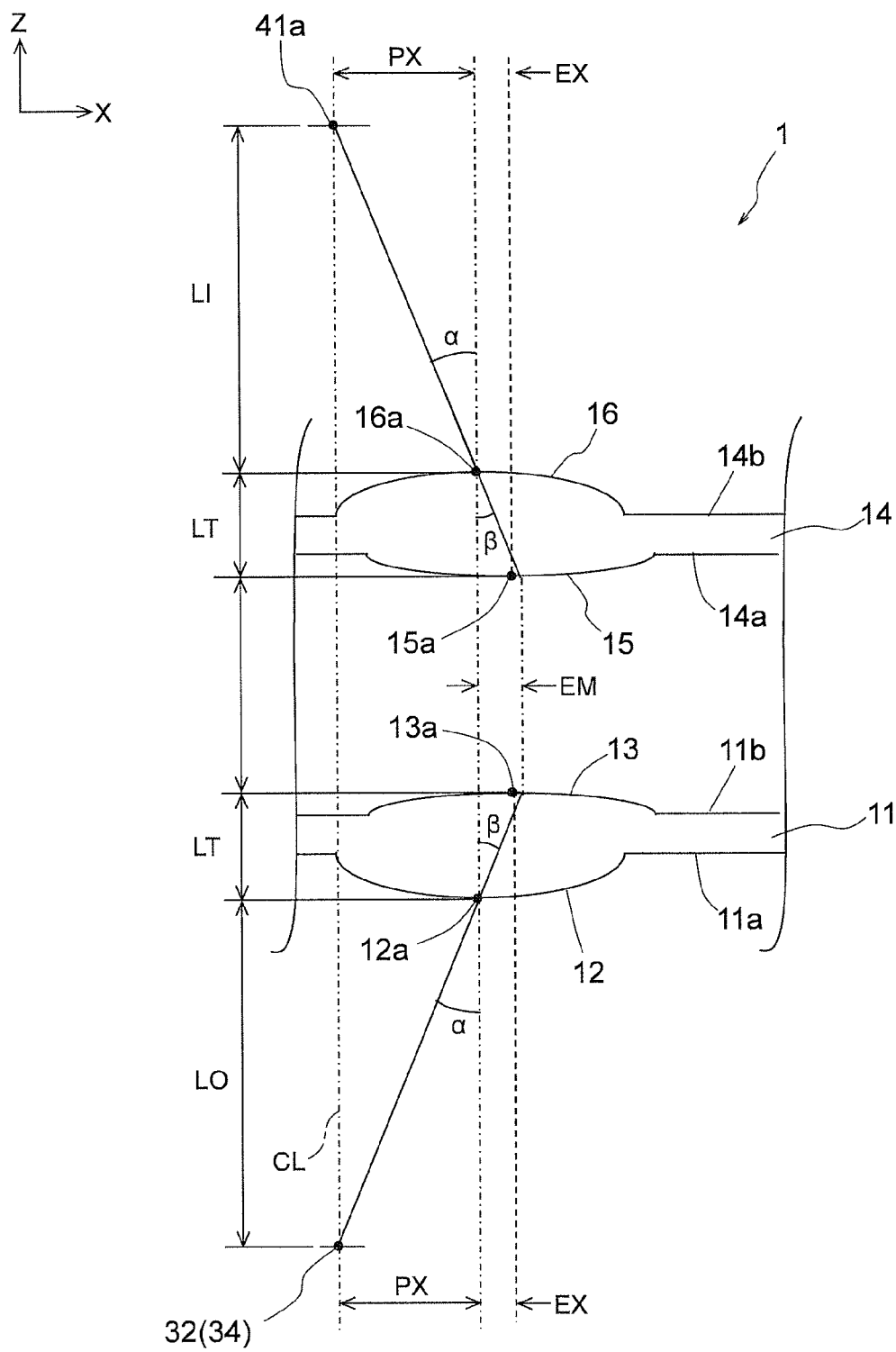
FIG. 17 is a sectional view showing a first lens plate and a second lens plate of Embodiment 2 corresponding to the sectional view taken along line IV-IV in FIG. 8.

Here, a consideration and an evaluation test for determining the range of the distance EX will be described. FIG. 17 is a sectional view corresponding to the sectional view taken along line IX-IX in FIG. 8 as with the FIG. 9.

In FIG. 17, the LED elements 34 of the LED array 32 are disposed below the first lens plate 11 (i.e., the negative side of the Z-axis). The drum surface 41a of the photosensitive drum 41 as an imaging surface is disposed above the second lens plate 14 (i.e., the positive side of the Z-axis).

The surface apex 12a of the lens surface 12 on the face surface 11a of the first lens plate 11 and the surface apex 16a of the lens surface 16 on the back surface 14b of the second lens plate 14 are distanced from the center CL of the lens unit 1 (corresponding to the center of the lens array 32) in the X-axis direction by the distance PX. Further, the surface apex 13a of the lens surface 13 on the back surface 11b of the first lens plate 11 and the surface apex 15a of the lens surface 15 on the face surface 14a of the second lens plate 14 are distanced from the center CL of the lens unit 1 (corresponding to the center of the lens array 32) in the X-axis direction by the distance PX+EX. Further, the positions of the openings 22 and 24 (FIG. 9) in the X-axis direction are substantially aligned with the position of the surface apex 13a of the lens surface 13 in the X-axis direction.

An angle between a straight line connecting the LED array 32 and the surface apex 12a of the lens surface 12 and the Z-axis direction is expressed as α. An emission angle of a light beam (emitted from the LED element 34) emitted from the lens surface 12 is expressed as β. A permissible distance in the X direction from the surface apex 12a to a position where the light beam passing the lens surface 12 crosses the lens surface 13 is expressed as EM. Based on Snell's law, the following equation (1) is satisfied.

$$\sin \alpha = n \cdot \sin \beta \tag{1}$$

Using the distance PX from the center of the LED array 32 to the surface apex 12a in the X-axis direction, the permissible distance EM, the surface intervals LO and LT (i.e., lens thicknesses) and the refractive index n, the equation (1) is rewritten to the following equation (2):

$$\frac{PX}{\sqrt{(PX)^2 + (LO)^2}} = \frac{n \cdot EM}{\sqrt{(LT)^2 + (EM)^2}} \tag{2}$$

Further, based on the equation (2), the permissible distance EM is expressed by the following equation (3):

$$EM = \frac{PX \cdot LT}{\sqrt{n^2\{(PX)^2 + (LO)^2\} - (PX)^2}} \tag{3}$$

Therefore, when the distance EX is the same as the permissible distance EM (i.e., EX=EM), the light beam emitted by the LED element 34 and incident on the surface apex 12a is also incident on the surface apex 13a. The light beam incident on both of the surface apexes 12a and 13a has the largest energy among the entire light beams emitted by the LED element 34 and incident on the lens surfaces 12 and 13, and define an optical axis of a lens having the lens surfaces 12 and 13. In this state, the optical axis is oriented to the LED element 34. When the permissible distance EM is 0, the optical axis of the lens becomes parallel with the Z-axis (i.e., oriented to a face side).

Therefore, when the permissible distance EM satisfies the following equation (4), the optical axis of the lens is oriented to between the face side and the LED element 34. The lens surfaces 12 and 13 of the lens unit 1 of Embodiment 2 are configured to satisfy the following equation (4):

$$0 < EX < EM = \frac{PX \cdot LT}{\sqrt{n^2\{(PX)^2 + (LO)^2\} - (PX)^2}} \tag{4}$$

Further, the second lens plate 14 and the first lens plate 11 have the same shape. The second lens plate 14 and the first lens plate 11 are symmetrical with each other with respect to, for example, an imaginary plane perpendicular to the Z-axis direction and disposed at an inteLmediate position between the second lens plate 14 and the first lens plate 11 in the Z-axis direction. The permissible distance EM, the distance EX, the distance PX and the lens thickness LT of the second lens plate 14 are the same as those of the first lens plate 11. In the LED head 3, the distances LI and LO are set as follows:

LI=LO=3.8 mm.

Next, description will be made of an evaluation test of vertical steaks (i.e., periodic streaks) or the like using an LED head having a lens unit of Comparison Example 2 in which EX=EM is satisfied as a test piece. The vertical streaks are evaluated using the optical image measuring device (FIGS. 12 and 13) in the same manner as described in Embodiment 1, and therefore detailed description is herein omitted.

The distance EX (=EM) of the lens unit of Comparison Example 2 is obtained by substituting 0.18 mm for the distance PX, substituting 3.8 mm for the distance LO, substituting 1.5247 for the refractive index n, and substituting 1.3 mm for the surface interval (i.e., the lens thickness) LT in equation (3). As a result, the distance EX is 40 μm.

TABLE 3 shows shapes of lens surfaces of the lens unit of Comparison Example 2.

TABLE 3

| LENS SURFACE | ITEM | LENS UNIT OF COMPARISON EXAMPLE 2 |
|---|---|---|
| LENS SURFACE 12 | RADIUS OF CURVATURE | 0.859875 |
| | 4TH ORDER ASPHERICAL COEFFICIENT | −0.372403 |
| | 6TH ORDER ASPHERICAL COEFFICIENT | −0.253113 |
| | 8TH ORDER ASPHERICAL COEFFICIENT | 0.0695272 |
| LENS SURFACE 13 | RADIUS OF CURVATURE | 1.00836 |
| | 4TH ORDER ASPHERICAL COEFFICIENT | −0.315045 |
| | 6TH ORDER ASPHERICAL COEFFICIENT | 0.262474 |
| | 8TH ORDER ASPHERICAL COEFFICIENT | −0.472922 |

Other dimensions of respective parts of the LED head of Comparison Example 2 are the same as those of the LED head 3 of Embodiment 1 shown in TABLE 1.

Figure 19A:
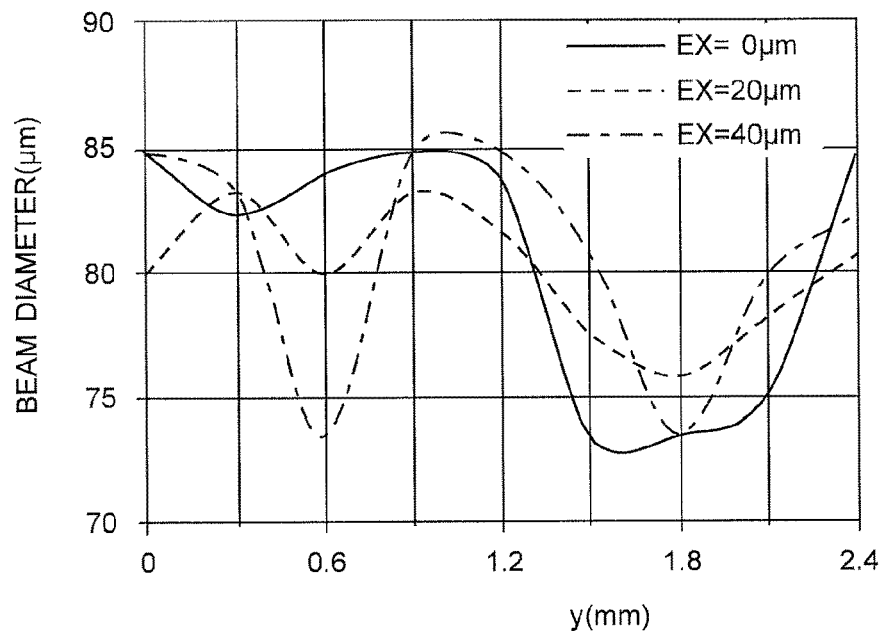
FIG. 19A is a graph showing beam diameters of respective dots of the LED head of Embodiment 1 and the LED heads of Comparison Examples 1 and 2 measured using the 45-degree slit with respect to the distance y (mm) from the predetermined position in the arrangement direction of the LED elements.
Figure 19B:
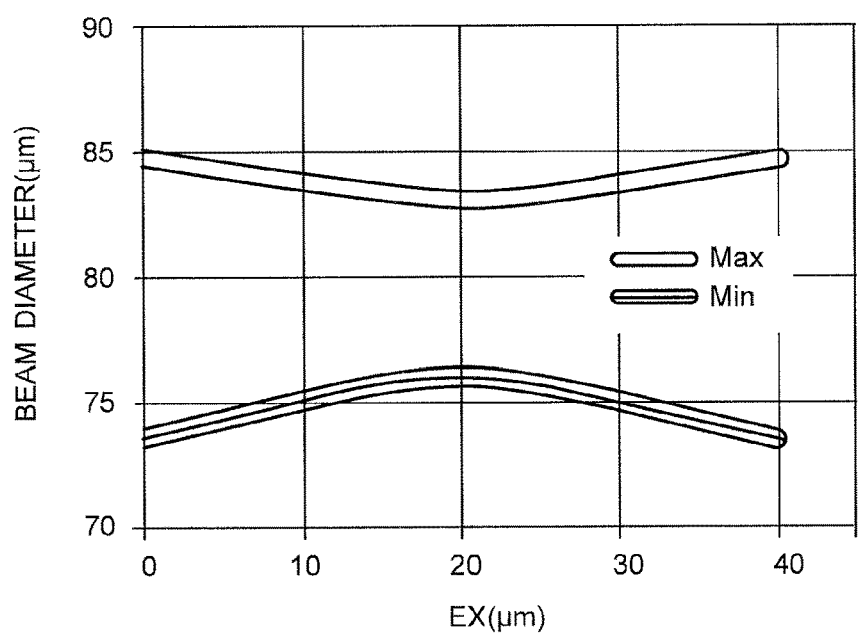
FIG. 19B is a graph showing maximum and minimum values of beam diameters of the LED head of Embodiment 1 and the LED heads of Comparison Examples 1 and 2 measured using the 45-degree slit with respect to the distance EX.

FIGS. 19A and 19B are graphs showing beam diameters (μm) of respective dots of the LED head 3 having the lens unit 1 of Embodiment 1 in which the distance EX is 20 μm, the LED head having the lens unit of Comparison Example 1 in which the distance EX is 0 and the LED head having the lens unit of Comparison Example 2 in which the distance EX is 40 μm, which are measured using the 45-degree slit 203b.

In FIG. 19A, a horizontal axis indicates a distance y (mm) from a predetermined position in the arrangement direction of the LED elements 34 (i.e., the Y-axis direction). A vertical axis indicates a 45-degree beam diameter (μm) at each position. In this regard, a range from 0 mm to 2.4 mm on the horizontal axis corresponds to double the arrangement interval PY (i.e., 1.2 mm) of the lens surfaces 12, 13, 15 and 16.

As shown in FIG. 19A, regarding the LED head of Comparison Example 2 in which the distance EX is 40 μm, a minimum value and a maximum value of the 45-degree beam diameter are respectively 74 μm and 86 μm. Measurement results for the LED head 3 of Embodiment 1 in which the distance EX is 20 μm and the LED head of Comparison Example 1 in which the distance EX is 0 are as described in Embodiment 1.

In FIG. 19B, a horizontal axis indicates the distance EX, and a vertical axis indicates a maximum value and a minimum value of the 45-degree beam diameter for each distance EX. In a range of the distance EX from 0 to 40 μm (i.e., 0<EX<40 μm), the changing amount of the 45-degree beam diameter is small. This is because the increase in the distance EX causes a change in arrangement of the lens surfaces in the widthwise direction of the lens unit 1 (i.e., the X-axis direction), and causes changes in the beam shapes in the widthwise direction of the lens unit 1.

Figure 18A:
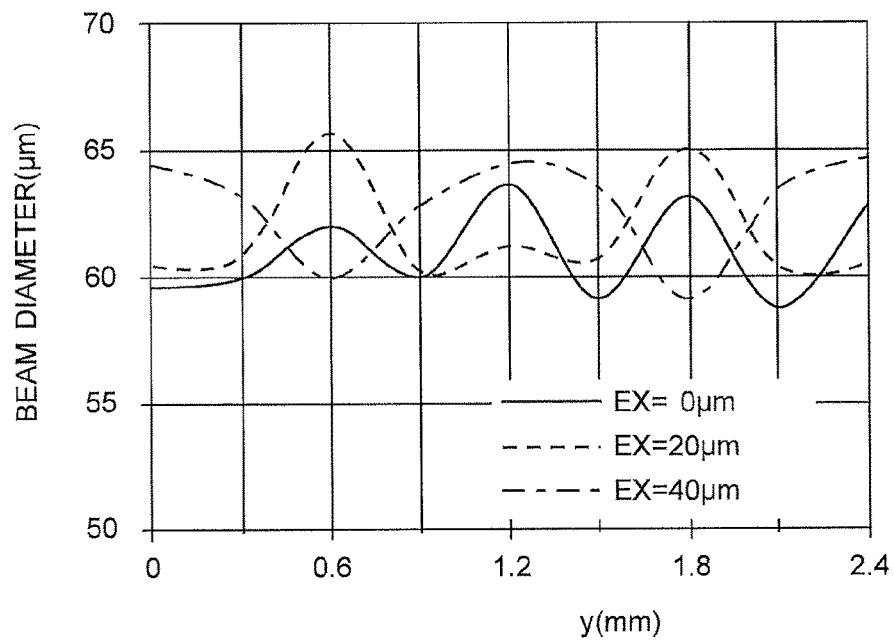
FIG. 18A is a graph showing beam diameters of respective dots of the LED head of Embodiment 1 and LED heads of Comparison Examples 1 and 2 measured using the 90-degree slit with respect to the distance y (mm) from the predetermined position in the arrangement direction of the LED elements.
Figure 18B:
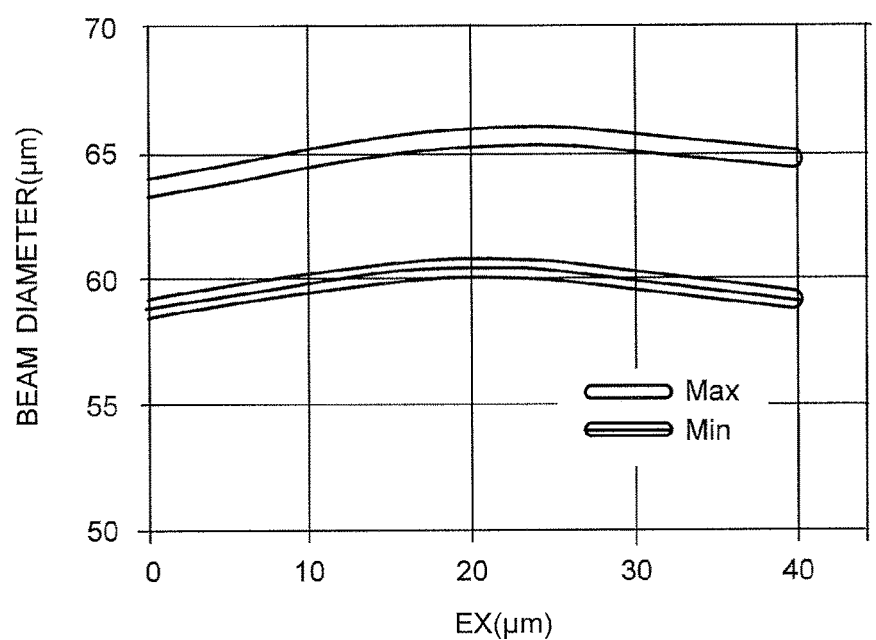
FIG. 18B is a graph showing maximum and minimum values of beam diameters of the LED head of Embodiment 1 and the LED heads of Comparison Examples 1 and 2 measured using the 45-degree slit with respect to the distance EX.

FIGS. 18A and 18B are graphs showing beam diameters (μm) of respective dots of the LED head 3 having the lens unit 1 of Embodiment 1 in which the distance EX is 20 μm, the LED head having the lens unit of Comparison Example 1 in which the distance EX is 0 and the LED head having the lens unit of Comparison Example 2 in which the distance EX is 40 μm, which are measured using the 90-degree slit 203a.

In FIG. 18A, a horizontal axis indicates a distance y (mm) from a predetermined position in the arrangement direction of the LED elements 34 (i.e., the Y-axis direction). A vertical axis indicates a 90-degree beam diameter (μm) at each position. In this regard, a range from 0 mm to 2.4 mm on the horizontal axis corresponds to double the arrangement interval PY (i.e., 1.2 mm) of the lens surfaces 12, 13, 15 and 16.

As shown in FIG. 18A, regarding the LED head of Comparison Example 2 in which the distance EX is 40 μm, a minimum value and a maximum value of the 90-degree beam diameter are respectively 59 μm and 64 μm. Measurement results for the LED head 3 of Embodiment 1 in which the distance EX is 20 μm and the LED head of Comparison Example in which the distance EX is 0 are as described in Embodiment 1.

In FIG. 18B, a horizontal axis indicates the distance EX, and a vertical axis indicates a maximum value and a minimum value of the 90-degree beam diameter for each distance EX. As shown in FIG. 18B, the changing amount of the 90-degree beam diameter is constantly about 5 μm. The reason why the changing amount of the 90-degree beam diameter does not substantially differ in Comparison Examples 1 and 2 and Embodiment 1 is as follows. The increase in the distance EX causes a change in arrangement of the lens surfaces in the widthwise direction of the lens unit 1 (i.e., the X-axis direction), but does not cause a change in arrangement of the lens surfaces in the arrangement direction of the LED elements 34 (i.e., the Y-axis direction). Therefore, the beam shape does not change in the arrangement direction of the LED elements 34.

Next, description will be made of a printing test performed by respectively mounting the LED head 3 of Embodiment 1, the LED head of the Comparison Example 1 and the LED head of the Comparison Example 2 to, for example, the color printer 90 shown in FIG. 1. Each of the LED heads of Embodiment 1, Comparison Example 1 and Comparison Example 2 is configured for A4 size recording sheets, has a resolution of 600 dpi, and includes the LED array 32 having a length WE of 208 mm. As a result of the printing test, vertical streaks occur on the image printed by the color printer 90 to which the LED head of Comparison Example 2 is mounted. An interval of the vertical streaks corresponds to the arrangement pitch PY (i.e., 1.2 mm) of the lens surfaces.

The changing amount of the 45-degree beam diameter increases as the distance EX becomes closer to the permissible distance EM as shown in FIG. 19B. This is because the surface apexes of the lens surfaces 12 and 13 are displaced from each other, and therefore aberration increases and prevents a sharp image from being formed. Further, since the surfaces apexes of the lens surfaces 12 and 13 are displaced from each other, image distortion increases, and causes distortion of the beam shape.

Therefore, as the distance EX gradually increases from 0, the changing amount of the 45-degree beam diameter decreases in a range where the distance EX is relatively small. This is because the optical axis of the lens is oriented to the LED element. However, the changing amount of the 45-degree beam diameter increases in a range where the distance EX is relatively large. This is because the effect of the orientation of the optical axis of the lens to the LED element is cancelled by increase in the aberration and the image distortion.

From the above described measurement results of the beam diameters and results of the printing test, the changing amount of the beam diameter in the widthwise direction of the lens unit 1 can be reduced, and occurrence of vertical streaks (at intervals corresponding to the arrangement interval of the lens surfaces) on the printed image can be reduced by the following arrangement. That is, as shown by way of example in FIG. 17, the first lens plate 11 on the LED array 32 side is configured so that the surface apexes 12*a* of the lens surfaces 12 on the LED array 32 side are displaced from the surface apexes 13*a* of the lens surfaces 13 on an image side (i.e., the photosensitive drum 41 side) toward the center CL of the lens unit 1 in the widthwise direction (i.e., the X-axis direction) by a predetermined amount. Further, the second lens plate 14 on the image side is configured so that the surface apexes 16*a* of the lens surfaces 16 on the image side are displaced from the surface apexes 15*a* of the lens surfaces 15 on the LED array 32 side toward the center CL of the lens unit 1 in the widthwise direction (i.e., the X-axis direction) by a predetermined amount.

As described above, according to the LED head of Embodiment 2, the range of the distance EX is suitably set according to the distance PX, the distance LO, the refractive index n and the lens thickness LT. Therefore, the lens unit and the color printer having the effects described in Embodiment 1 can be obtained in a simple manner.

In the above description, terms such as "above", "below", "left", "right", "face" and "back" are used for convenience of description, and are not to be understood to limit a positional relationship of the lens unit.

Further, in the above described embodiments, the color printer has been described as an example of an image forming apparatus. However, the present invention is not limited to the color printer, but is also applicable to a copier, a facsimile machine, an MFP (Multi-Function Peripheral) or the like. Further, a monochrome printer can be used instead of the color printer.

While the preferred embodiments of the present invention have been illustrated in detail, it should be apparent that modifications and improvements may be made to the invention without departing from the spirit and scope of the invention as described in the following claims.

What is claimed is:

1. A lens unit comprising:
a first lens array forming a reduced inverted image of a light emitting portion disposed on an incident side of the first lens array, and
a second lens array forming a magnified inverted image of the reduced inverted image,
the first lens array comprising:
a plurality of first lenses arranged in at least two rows parallel with each other, the plurality of first lenses being arranged in a first direction in each row, each of the plurality of first lenses allowing light to pass in a second direction,
wherein an arrangement center is defined at a center position between the two rows in a third direction perpendicular to both of the first direction and the second direction,
wherein each of the plurality of first lenses includes a first incident surface and a first emission surface,
wherein a surface apex of the first emission surface is displaced with respect to a surface apex of the first incident surface in a direction away from the arrangement center in the third direction,
the second lens array comprising:
a plurality of second lenses arranged in at least two rows parallel with each other, the plurality of second lenses being arranged in the first direction in each row, each of the plurality of second lenses allowing light to pass in the second direction,
wherein each of the plurality of second lenses includes a second incident surface and a second emission surface,
wherein a surface apex of the second incident surface is displaced with respect to a surface apex of the second emission surface in a direction away from the arrangement center in the third direction.

2. The lens unit according to claim 1, wherein PX represents a distance from the arrangement center to the surface apex of the first incident surface and also represents a distance from the arrangement center to the surface apex of the second emission surface,
wherein a distance from the arrangement center to the surface apex of the first emission surface is larger than the distance PX by a distance EX, and a distance from the arrangement center to the surface apex of the second incident surface is also larger than the distance PX by the distance EX,
wherein LO represents a distance from the light emitting portion to the first lens array,
wherein n represents a refractive index of each of the plurality of first lenses of the first lens array and the second lenses of the second lens array, and
wherein LT represents a thickness of each of the first lenses of the first lens array and the second lenses of the second lens array, and
wherein EM represents a permissible distance expressed by the following equation:

$$EM = \frac{PX \cdot LT}{\sqrt{n^2\{(PX)^2 + (LO)^2\} - (PX)^2}}$$

wherein the following relationship is satisfied:

0<EX<EM.

3. The lens unit according to claim 2, wherein EX satisfies the following relationship:

0<EX<40 μm.

4. The lens unit according to claim 2, further comprising:
a first light blocking plate disposed between the light emitting portion and the first lens array, the first light blocking plate having openings facing the plurality of first lenses of the first lens array, and a second light blocking plate disposed between the first lens array and the second lens array, the second light blocking plate having openings facing the plurality of second lenses of the second lens array.

5. An exposure device comprising:

the lens unit according to claim 1; and the light emitting portion, wherein the lens unit focuses a light beam emitted by the light emitting portion on a predetermined portion.

6. An LED head comprising:

the lens unit according to claim 1; and an LED array as the light emitting portion, wherein the lens unit focuses a light beam emitted by the LED array on a predetermined portion.

7. An image forming apparatus comprising:

a latent image bearing body that bears a latent image;

the lens unit according to claim 1; and the light emitting portion, wherein the lens unit focuses a light beam emitted by the light emitting portion on the latent image bearing body.

* * * * *